US012226907B2

(12) United States Patent
Mizoguchi et al.

(10) Patent No.: US 12,226,907 B2
(45) Date of Patent: Feb. 18, 2025

(54) ROBOTIC SYSTEMS WITH MASS DETECTION, AND RELATED SYSTEMS AND METHODS

(71) Applicant: MUJIN, Inc., Tokyo (JP)

(72) Inventors: Hironori Mizoguchi, Tokyo (JP); Yoshiki Kanemoto, Tokyo (JP)

(73) Assignee: Mujin, Inc., Tokyo (JP)

( * ) Notice: Subject to any disclaimer, the term of this patent is extended or adjusted under 35 U.S.C. 154(b) by 386 days.

(21) Appl. No.: 17/573,447

(22) Filed: Jan. 11, 2022

(65) Prior Publication Data
US 2022/0314440 A1 Oct. 6, 2022

Related U.S. Application Data

(60) Provisional application No. 63/171,086, filed on Apr. 6, 2021.

(51) Int. Cl.
*B25J 9/16* (2006.01)
*B25J 13/08* (2006.01)
*B25J 15/06* (2006.01)

(52) U.S. Cl.
CPC ........... *B25J 9/1633* (2013.01); *B25J 9/1674* (2013.01); *B25J 9/1692* (2013.01); *B25J 13/085* (2013.01); *B25J 15/0616* (2013.01)

(58) Field of Classification Search
CPC ...... B25J 9/1633; B25J 9/1674; B25J 9/1692; B25J 13/085; B25J 15/0052;
(Continued)

(56) References Cited

U.S. PATENT DOCUMENTS 4,767,257 A * 8/1988 Kato .................... B25J 19/0025
285/190
5,791,861 A * 8/1998 Seelig ...................... B65G 47/91
294/185
(Continued)

FOREIGN PATENT DOCUMENTS

| JP | 2019166613 A | 10/2019 |
| JP | 6832599 B | 2/2021 |
| WO | 2017037967 A1 | 6/2018 |

OTHER PUBLICATIONS

CNIPA Notice to Grant mailed Aug. 9, 2022 for Chinese patent application No. 202220788605.1, 2 pages.
(Continued)

*Primary Examiner* — Dean J Kramer
(74) *Attorney, Agent, or Firm* — Perkins Coie LLP

(57) ABSTRACT

End effectors for use with a robotic object-gripping system, and related systems and methods, are disclosed herein. In some embodiments, the end effector includes a first mounting structure, a force sensor coupled to the first mounting structure, a second mounting structure coupled to the force sensor, and a gripper assembly coupled to the second mounting structure. The force sensor is beneath the longitudinal plane and is configured to measure forces along a vertical axis. The end effector also includes a first bracket coupled to the first mounting structure and a second bracket coupled to the second mounting structure. The first and second brackets are configured to connect to the connection tubes to isolate the connection tubes, and any forces therein, to a longitudinal direction between the first bracket and the second bracket, thereby reducing the noise on the force sensor from the connection tubes during operation.

16 Claims, 14 Drawing Sheets

(58) Field of Classification Search
CPC .... B25J 15/0616; B25J 9/1664; B25J 9/1679; B25J 9/1687; B25J 19/0095; B25J 13/082; B66C 1/0237; B66C 1/0243; B66C 1/025
USPC .................................................. 294/65, 185
See application file for complete search history.

(56) References Cited

U.S. PATENT DOCUMENTS

| | | | |
|---|---|---|---|
| 6,811,124 B2* | 11/2004 | Karlinger | F16L 3/26 248/79 |
| 10,059,011 B2* | 8/2018 | Burlot | B25J 19/0025 |
| 10,913,165 B1* | 2/2021 | Jonas | B25J 19/0041 |
| 2009/0166478 A1* | 7/2009 | Choi | B25J 19/0025 248/51 |

OTHER PUBLICATIONS

JPO Decision to Grant mailed Aug. 4, 2022 for Japanese patent application No. 2022062998, 3 pages.
JPO Office Action mailed May 19, 2022 for Japanese patent application No. 2022062998, 11 pages.

* cited by examiner

ROBOTIC SYSTEMS WITH MASS DETECTION, AND RELATED SYSTEMS AND METHODS

CROSS-REFERENCE TO RELATED APPLICATION(S)

The present application claims the benefit of U.S. Provisional Patent Application No. 63/171,086, filed Apr. 6, 2021, the entirety of which is incorporated herein by reference.

TECHNICAL FIELD

The present technology related generally to robotic systems with gripping mechanisms, and more specifically robotic systems with features for reducing noise associated with the gripping mechanisms.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing human involvements that are otherwise required to perform dangerous or repetitive tasks.

However, despite the technological advancements, robots often lack the sophistication necessary to duplicate human interactions required for executing larger and/or more complex tasks. Accordingly, there remains a need for improved techniques and systems for managing operations of and/or interactions between robots.

Figure 1:
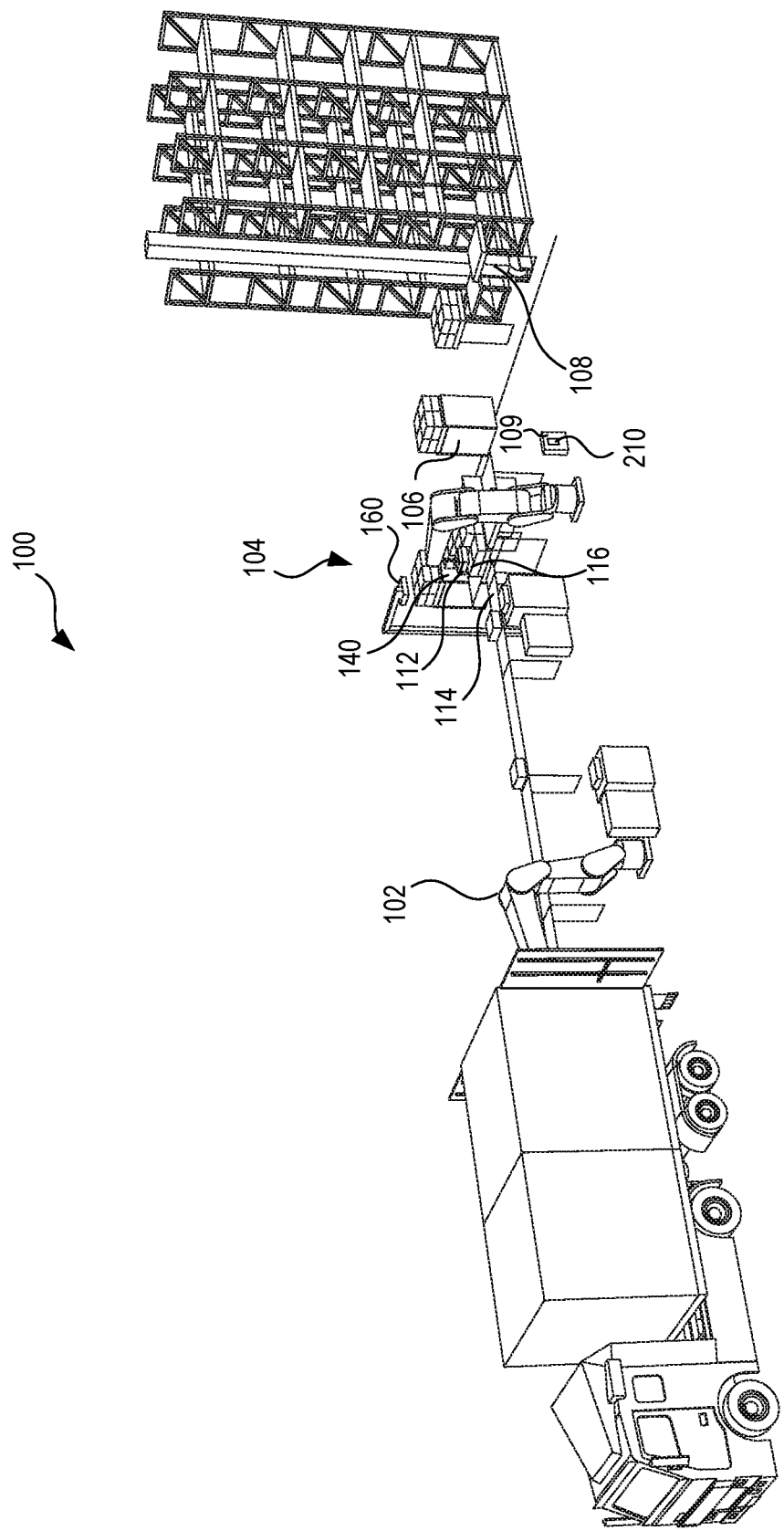
FIG. 1 is an illustration of an example environment in which a robotic system with a gripping mechanism can operate in accordance with some embodiments of the present technology.

The drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described.

For ease of reference, the end effector and the components thereof are sometimes described herein with reference to top and bottom, upper and lower, upwards and downwards, a longitudinal plane, a horizontal plane, an x-y plane, a vertical plane, and/or a z-plane relative to the spatial orientation of the embodiments shown in the figures. It is to be understood, however, that the end effector and the components thereof can be moved to, and used in, different spatial orientations without changing the structure and/or function of the disclosed embodiments of the present technology.

DETAILED DESCRIPTION

Overview

End effectors for use with a robotic object-gripping system, and related systems and methods, are disclosed herein. The end effector can include a first mounting structure, a force sensor coupled to (e.g., carried by) the first mounting structure, a second mounting structure coupled to the force sensor, and a gripper assembly coupled to the second mounting structure. The first mounting structure has a first end couplable to a robotic arm of the object-gripping system (e.g., through an arm connection component) and a second end spaced apart from the first end in a longitudinal plane (e.g., an x-y plane). The force sensor is coupled to the second end of the first mounting structure beneath the longitudinal plane (e.g., coupled to a lower surface of the first mounting structure). The force sensor is configured to measure forces in a first direction at least partially orthogonal to the longitudinal plane (e.g., along a vertical axis) to allow the end effector (or a controller operably coupled thereto) to determine the mass of various objects during operation. The second mounting structure is coupled to (and carried by) the force sensor and the gripper assembly is coupled to (and carried by) the second mounting structure. As a result, the weight of the second mounting structure and the gripper assembly is constantly measured by the force sensor, as is the weight of any objects the gripper assembly grips.

In various embodiments, the gripper assembly can include one or more gripping components that are each operably coupleable to a connection tube to receive a biasing force (e.g., a suction force, voltage, current, pressure, and the like). The gripping components can each (e.g., individually) use the biasing force to pick up one or more target objects. When an object is picked up by the gripper assembly, the weight of the picked object applies a downward force to the end effector that is measured by the force sensor. As discussed in greater detail below, the object-gripping system can then use the measured force to ensure the picking operation was successful (e.g., that the intended target object(s) were fully picked up and/or that no unintended objects were picked up), and/or to adjust operation when the picking operation was unsuccessful (e.g., to determine how many target object(s) were not picked up and/or how many unintended objects were picked up).

During operation, the movement of the connection tubes due to the engagement and/or disengagement of the biasing force and/or the movement of the end effector between locations can introduce noise (e.g., disturbance forces) in the measurements by the force sensor. Purely by way of example, when the biasing force is a suction force, the suction force can cause the connection tubes to shift and/or pull upward on the gripper assembly when the suction force is engaged. The resulting movement and forces can be picked up by the force sensor and thereby confuse the object-gripping system. In another example, as the end effector is moved between two locations (e.g., a picking location and a dropping location), the connection tubes can shift around, causing noise in the force sensor and thereby confusing the object-gripping system.

The noise can undermine the operation of the robotic system, especially when the end effector is used to move relatively small target objects. To address the noise, the end effector can also include a noise reduction component. The noise reduction component can include a first bracket coupled to the first mounting structure and a second bracket coupled to the second mounting structure. Each of the first and second brackets include one or more tube connectors (and/or tube-mounting components, mounting spaces, and/or securing elements) configured to couple to and/or anchor the connection tubes. Accordingly, the first and second brackets can attach the connection tubes to the end effector to help manage the noise from the connection tubes during operation of the object-gripping system. For example, each of the first and second brackets can help organize the connection tubes and reduce their movement during operation. Further, the one or more tube-mounting components on the first bracket can be parallel with the one or more tube-mounting components on the second bracket along a longitudinal direction (e.g., within an x-y plane). Accordingly, the first and second brackets can isolate the connection tubes, and any movement or forces therein, in the longitudinal direction between the first bracket and the second bracket. As a result, the noise resulting from the movement of and/or the forces translated through the connection tubes is at least partially isolated to the longitudinal direction.

Said another way, the disclosed arrangement of the first and second brackets can largely reduce (or eliminate) the noise caused by the connection tubes. For example, because the first bracket is coupled to the first mounting structure, the first bracket can absorb forces and/or movement (e.g., while the end effector is moved between two locations) upstream from the force sensor. Similarly, because the second bracket coupled to the second mounting structure, the second bracket can redirect forces and/or movement downstream from the force sensor (e.g., a pullback motion and force when the biasing force is engaged) toward the first bracket. Further, because the one or more tube-mounting components on the first and second brackets are arranged parallel along the longitudinal direction, the movement of and/or the forces translated through the connection tubes is redirected into a plane that is not measured by the force sensor. As a result, the first and second brackets allow the biasing force and/or noise associated with movement of the connection tubes to bypass the force sensor. In doing so, the first and second brackets can largely reduce (or eliminate) the noise on the force sensor, thereby improving the performance of the end-effector and the related robotic system.

In some embodiments, the end-effector includes a third bracket coupled to the first mounting structure opposite the first bracket, and a fourth bracket coupled to the second mounting structure opposite the second bracket. Like the first and second brackets, each of the third and fourth brackets can include one or more tube connectors (or tube-mounting components) configured to couple to and/or anchor the connection tubes. Further, the one or more tube-mounting components on the third bracket can be parallel with the one or more tube-mounting components on the fourth bracket along the longitudinal direction. As a result, the third and fourth brackets can also isolate the biasing force and/or noise from movement to the longitudinal direction while traveling through/around the force sensor. Thus, the third and fourth brackets can allow the end effector to carry and operate an additional number of gripping components while reducing (or eliminating) the additional associated noise.

Further, although primarily discussed herein for use with an end-effector with a plurality of small gripping components, one of skill in the art will understand that the scope of the invention is not so limited. For example, the end effector can include only any number of gripping components configured to pick up any sized target object. Further, the disclosed configuration of brackets within the end effector can be deployed in any suitable system needing to isolate forces to an alternative plane while traveling through and/or around a force sensor. Accordingly, the scope of the invention is not confined to any subset of embodiments, and is confined only by the limitations set out in the appended claims.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer-executable or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices, including palm-top computers, wearable computers, cellular or mobile phones, multi-processor systems, processor-based or programmable consumer electronics, network computers, mini computers, and the like. Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Example Environment for Robotic System

FIG. 1 is an illustration of an example environment in which a robotic system 100 with an object handling mechanism can operate. The operating environment for the robotic system 100 can include one or more structures, such as robots or robotic devices, configured to execute one or more tasks. Aspects of the object handling mechanism can be practiced or implemented by the various structures and/or components.

In the example illustrated in FIG. 1, the robotic system 100 can include an unloading unit 102, a transfer unit 104, a transport unit 106, a loading unit 108, or a combination thereof in a warehouse, a distribution center, or a shipping hub. Each of the units in the robotic system 100 can be configured to execute one or more tasks. The tasks can be combined in sequence to perform an operation that achieves a goal, for example, such as to unload objects from a vehicle, such as a truck, trailer, a van, or train car, for storage in a warehouse or to unload objects from storage locations and load them onto a vehicle for shipping. In another example, the task can include moving objects from one location, such as a container, bin, cage, basket, shelf, platform, pallet, or conveyor belt, to another location. Each of the units can be configured to execute a sequence of actions, such as operating one or more components therein, to execute a task.

In some embodiments, the task can include interaction with a target object 112, such as manipulation, moving, reorienting or a combination thereof, of the object. The target object 112 is the object that will be handled by the robotic system 100. More specifically, the target object 112 can be the specific object among many objects that is the target of an operation or task by the robotics system 100. For example, the target object 112 can be the object that the robotic system 100 has selected for or is currently being handled, manipulated, moved, reoriented, or a combination thereof. The target object 112, as examples, can include boxes, cases, tubes, packages, bundles, an assortment of individual items, or any other object that can be handled by the robotic system 100.

As an example, the task can include transferring the target object 112 from an object source 114 to a task location 116. The object source 114 is a receptacle for storage of objects. The object source 114 can include numerous configurations and forms. For example, the object source 114 can be a platform, with or without walls, on which objects can be placed or stacked, such as a pallet, a shelf, or a conveyor belt. As another, the object source 114 can be a partially or fully enclosed receptacle with walls or lid in which objects can be placed, such as a bin, cage, or basket. In some embodiments, the walls of the object source 114 with the partially or fully enclosed can be transparent or can include openings or gaps of various sizes such that portions of the objects contained therein can be visible or partially visible through the walls.

FIG. 1 illustrates examples of the possible functions and operations that can be performed by the various units of the robotic system 100 in handling the target object 112 and it is understood that the environment and conditions can differ from those described hereinafter. For example, the unloading unit 102 can be a vehicle offloading robot configured to transfer the target object 112 from a location in a carrier, such as a truck, to a location on a conveyor belt. Also, the transfer unit 104, such as a palletizing robot, can be configured to transfer the target object 112 from a location on the conveyor belt to a location on the transport unit 106, such as for loading the target object 112 on a pallet on the transport unit 106. In another example, the transfer unit 104 can be a piece-picking robot configured to transfer the target object 112 from one container to another container. In completing the operation, the transport unit 106 can transfer the target object 112 from an area associated with the transfer unit 104 to an area associated with the loading unit 108, and the loading unit 108 can transfer the target object 112, such as by moving the pallet carrying the target object 112, from the transfer unit 104 to a storage location, such as a location on the shelves. Details regarding the task and the associated actions are described below.

For illustrative purposes, the robotic system 100 is described in the context of a shipping center; however, it is understood that the robotic system 100 can be configured to execute tasks in other environments or for other purposes, such as for manufacturing, assembly, packaging, healthcare, or other types of automation. It is also understood that the robotic system 100 can include other units, such as manipulators, service robots, modular robots, that are not shown in FIG. 1. For example, in some embodiments, the robotic system 100 can include a depalletizing unit for transferring the objects from cages, carts, or pallets onto conveyors or other pallets, a container-switching unit for transferring the objects from one container to another, a packaging unit for wrapping the objects, a sorting unit for grouping objects according to one or more characteristics thereof, a piece-picking unit for manipulating the objects differently, such as sorting, grouping, and/or transferring, according to one or more characteristics thereof, or a combination thereof.

The robotic system 100 can include a controller 109 configured to interface with and/or control one or more of the robotic units. For example, the controller 109 can include circuits (e.g., one or more processors, memory, etc.) configured to derive motion plans and/or corresponding commands, settings, and the like used to operate the corresponding robotic unit. The controller 109 can communicate the motion plans, the commands, settings, etc. to the robotic unit, and the robotic unit can execute the communicated plan to accomplish a corresponding task, such as to transfer the target object 112 from the object source 114 to the task location 116.

Suitable System

Figure 2:
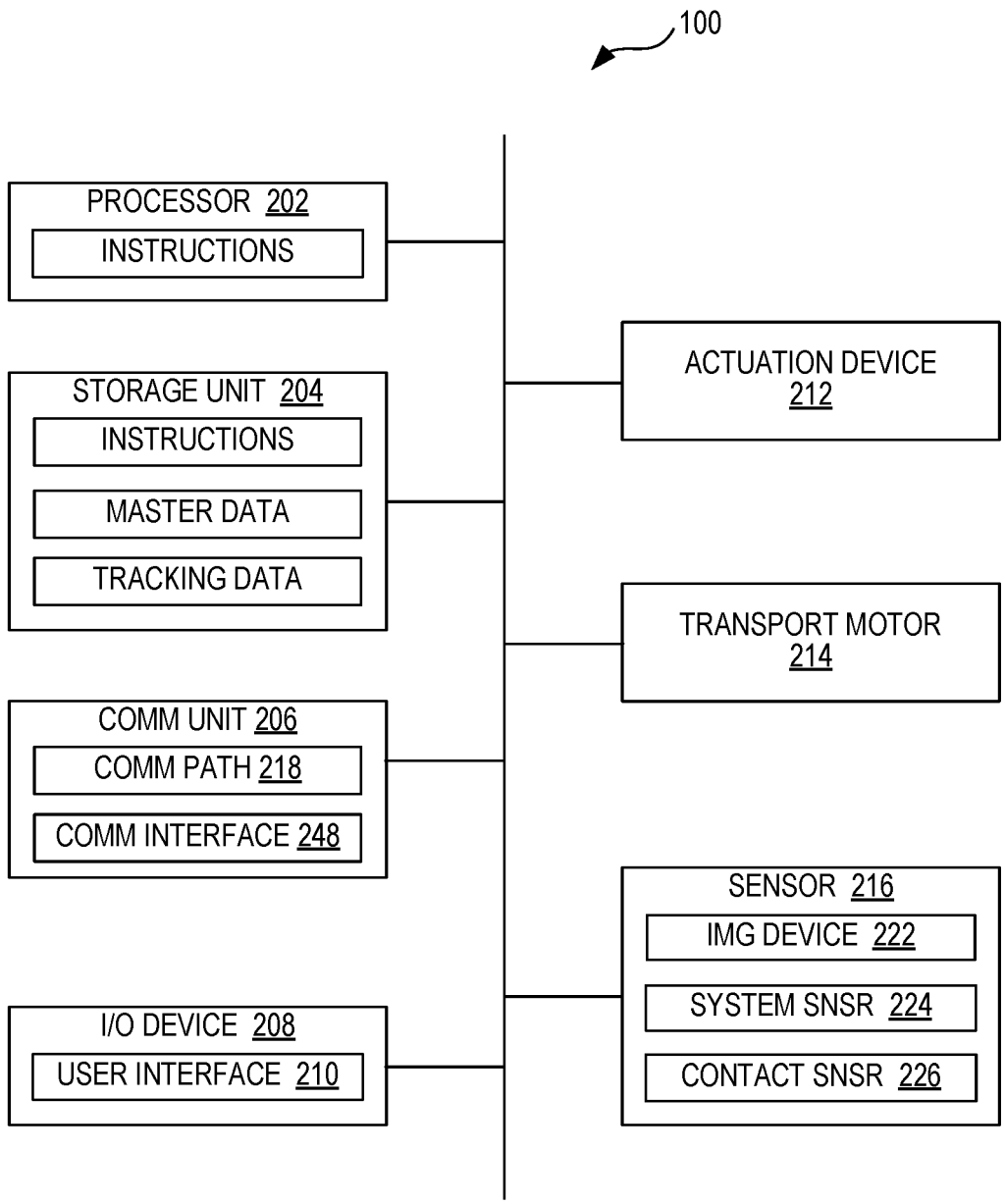
FIG. 2 is a block diagram illustrating the robotic system of FIG. 1 in accordance with some embodiments of the present technology.

FIG. 2 is a block diagram illustrating the robotic system 100 in accordance with one or more embodiments of the present technology. In some embodiments, for example, the robotic system 100 can include electronic devices, electrical devices, or a combination thereof, such as a control unit 202 (sometimes also referred to herein as a "processor 202"), a storage unit 204, a communication unit 206, a system input/output (I/O) device 208 having a system interface 210 (sometimes also referred to herein as a "user interface 210"), one or more actuation devices 212, one or more transport motors 214, one or more sensor units 216, or a combination thereof that are coupled to one another, integrated with or coupled to one or more of the units or robots described in FIG. 1 above, or a combination thereof.

The control unit 202 can be implemented in a number of different ways. For example, the control unit 202 can be a processor, an application specific integrated circuit (ASIC), an embedded processor, a microprocessor, a hardware control logic, a hardware finite state machine (FSM), a digital signal processor (DSP), or a combination thereof. The control unit 202 can execute software and/or instructions to provide the intelligence of the robotic system 100.

The control unit 202 can be operably coupled to the user interface 210 to provide a user with control over the control unit 202. The user interface 210 can be used for communication between the control unit 202 and other functional units in the robotic system 100. The user interface 210 can also be used for communication that is external to the robotic system 100. The user interface 210 can receive information from the other functional units or from external sources, or can transmit information to the other functional units or to external destinations. The external sources and the external destinations refer to sources and destinations external to the robotic system 100.

The user interface 210 can be implemented in different ways and can include different implementations depending on which functional units or external units are being interfaced with the user interface 210. For example, the user interface 210 can be implemented with a pressure sensor, an inertial sensor, a microelectromechanical system (MEMS), optical circuitry, waveguides, wireless circuitry, wireline circuitry, application programming interface, or a combination thereof.

The storage unit 204 can store the software instructions, master data, tracking data or a combination thereof. For illustrative purposes, the storage unit 204 is shown as a single element, although it is understood that the storage unit 204 can be a distribution of storage elements. Also for illustrative purposes, the robotic system 100 is shown with the storage unit 204 as a single hierarchy storage system, although it is understood that the robotic system 100 can have the storage unit 204 in a different configuration. For example, the storage unit 204 can be formed with different storage technologies forming a memory hierarchal system including different levels of caching, main memory, rotating media, or off-line storage.

The storage unit 204 can be a volatile memory, a nonvolatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM). As a further example, storage unit 204 can be a non-transitory computer medium including the non-volatile memory, such as a hard disk drive, NVRAM, solid-state storage device (SSD), compact disk (CD), digital video disk (DVD), or universal serial bus (USB) flash memory devices. The software can be stored on the non-transitory computer readable medium to be executed by a control unit 202.

The storage unit 204 can be operably coupled to the user interface 210. The user interface 210 can be used for communication between the storage unit 204 and other functional units in the robotic system 100. The user interface 210 can also be used for communication that is external to the robotic system 100. The user interface 210 can receive information from the other functional units or from external sources, or can transmit information to the other functional units or to external destinations. The external sources and the external destinations refer to sources and destinations external to the robotic system 100.

Similar to the discussion above, the user interface 210 can include different implementations depending on which functional units or external units are being interfaced with the storage unit 204. The user interface 210 can be implemented with technologies and techniques similar to the implementation of the user interface 210 discussed above.

In some embodiments, the storage unit 204 is used to further store and provide access to processing results, predetermined data, thresholds, or a combination thereof. For example, the storage unit 204 can store the master data that includes descriptions of the one or more target objects 112 (e.g., boxes, box types, cases, case types, products, and/or a combination thereof). In one embodiment, the master data includes dimensions, predetermined shapes, templates for potential poses and/or computer-generated models for recognizing different poses, a color scheme, an image, identification information (e.g., bar codes, quick response (QR) codes, logos, and the like), expected locations, an expected weight, and/or a combination thereof, for the one or more target objects 112 expected to be manipulated by the robotic system 100.

In some embodiments, the master data includes manipulation-related information regarding the one or more objects that can be encountered or handled by the robotic system 100. For example, the manipulation-related information for the objects can include a center-of-mass location on each of the objects, expected sensor measurements (e.g., for force, torque, pressure, and/or contact measurements), corresponding to one or more actions, maneuvers, or a combination thereof.

The communication unit 206 can enable external communication to and from the robotic system 100. For example, the communication unit 206 can enable the robotic system 100 to communicate with other robotic systems or units, external devices, such as an external computer, an external database, an external machine, an external peripheral device, or a combination thereof, through a communication path 218, such as a wired or wireless network.

The communication path 218 can span and represent a variety of networks and network topologies. For example, the communication path 218 can include wireless communication, wired communication, optical communication, ultrasonic communication, or the combination thereof. For example, satellite communication, cellular communication, Bluetooth, Infrared Data Association standard (IrDA), wireless fidelity (WiFi), and worldwide interoperability for microwave access (WiMAX) are examples of wireless communication that can be included in the communication path 218. Cable, Ethernet, digital subscriber line (DSL), fiber optic lines, fiber to the home (FTTH), and plain old telephone service (POTS) are examples of wired communication that can be included in the communication path 218. Further, the communication path 218 can traverse a number of network topologies and distances. For example, the communication path 218 can include direct connection, personal area network (PAN), local area network (LAN), metropolitan area network (MAN), wide area network (WAN), or a combination thereof. The robotic system 100 can transmit information between the various units through the communication path 218. For example, the information can be transmitted between the control unit 202, the storage unit 204, the communication unit 206, the I/O device 208, the actuation devices 212, the transport motors 214, the sensor units 216, or a combination thereof.

The communication unit 206 can also function as a communication hub allowing the robotic system 100 to function as part of the communication path 218 and not limited to be an end point or terminal unit to the communication path 218. The communication unit 206 can include active and passive components, such as microelectronics or an antenna, for interaction with the communication path 218.

The communication unit 206 can include a communication interface 248. The communication interface 248 can be used for communication between the communication unit 206 and other functional units in the robotic system 100. The communication interface 248 can receive information from the other functional units or from external sources, or can transmit information to the other functional units or to external destinations. The external sources and the external destinations refer to sources and destinations external to the robotic system 100.

The communication interface 248 can include different implementations depending on which functional units are being interfaced with the communication unit 206. The communication interface 248 can be implemented with technologies and techniques similar to the implementation of the control interface 240.

The I/O device 208 can include one or more input sub-devices and/or one or more output sub-devices. Examples of the input devices of the I/O device 208 can include a keypad, a touchpad, soft-keys, a keyboard, a microphone, sensors for receiving remote signals, a camera for receiving motion commands, or any combination thereof to provide data and communication inputs. Examples of the output device can include a display interface. The display interface can be any graphical user interface such as a display, a projector, a video screen, and/or any combination thereof.

The control unit 202 can operate the I/O device 208 to present or receive information generated by the robotic system 100. The control unit 202 can operate the I/O device 208 to present information generated by the robotic system 100. The control unit 202 can also execute the software and/or instructions for the other functions of the robotic system 100. The control unit 202 can further execute the software and/or instructions for interaction with the communication path 218 via the communication unit 206.

The robotic system 100 can include physical or structural members, such as robotic manipulator arms, that are connected at joints for motion, such as rotational displacement, translational displacements, or a combination thereof. The structural members and the joints can form a kinetic chain configured to manipulate an end-effector, such as a gripping element, to execute one or more task, such as gripping, spinning, or welding, depending on the use or operation of the robotic system 100. The robotic system 100 can include the actuation devices 212, such as motors, actuators, wires, artificial muscles, electroactive polymers, or a combination thereof, configured to drive, manipulate, displace, reorient, or a combination thereof, the structural members about or at a corresponding joint. In some embodiments, the robotic system 100 can include the transport motors 214 configured to transport the corresponding units from place to place.

The robotic system 100 can include the sensor units 216 configured to obtain information used to execute tasks and operations, such as for manipulating the structural members or for transporting the robotic units. The sensor units 216 can include devices configured to detect or measure one or more physical properties of the robotic system 100, such as a state, a condition, a location of one or more structural members or joints, information about objects or surrounding environment, or a combination thereof. As an example, the sensor units 216 can include imaging devices, system sensors, contact sensors, and/or any combination thereof.

In some embodiments, the sensor units 216 include one or more imaging devices 222. The imaging devices 222 are devices configured to detect and image the surrounding environment. For example, the imaging devices 222 can include 2-dimensional cameras, 3-dimensional cameras, both of which can include a combination of visual and infrared capabilities, lidars, radars, other distance-measuring devices, and other imaging devices. The imaging devices 222 can generate a representation of the detected environment, such as a digital image or a point cloud, used for implementing machine/computer vision for automatic inspection, robot guidance, or other robotic applications. As described in further detail below, the robotic system 100 can process the digital image, the point cloud, or a combination thereof via the control unit 202 to identify the target object 112 of FIG. 1, a pose of the target object 112 of, or a combination thereof. For manipulating the target object 112, the robotic system 100 can capture and analyze an image of a designated area, such as inside the truck, inside the container, or a pickup location for objects on the conveyor belt, to identify the target object 112 and the object source 114 of FIG. 1 thereof. Similarly, the robotic system 100 can capture and analyze an image of another designated area, such as a drop location for placing objects on the conveyor belt, a location for placing objects inside the container, or a location on the pallet for stacking purposes, to identify the task location 116 of FIG. 1.

In some embodiments, the sensor units 216 can include system sensors 224. The system sensors 224 can monitor the robotic units within the robotic system 100. For example, the system sensors 224 can include units or devices to detect and monitor positions of structural members, such as the robotic arms and the end-effectors, corresponding joints of robotic units or a combination thereof. As a further example, the robotic system 100 can use the system sensors 224 to track locations, orientations, or a combination thereof of the structural members and the joints during execution of the task. Examples of the system sensors 224 can include accelerometers, gyroscopes, or position encoders.

In some embodiments, the sensor units 216 can include the contact sensors 226, such as pressure sensors, force sensors, strain gauges, piezoresistive/piezoelectric sensors, capacitive sensors, elastoresistive sensors, torque sensors, linear force sensors, other tactile sensors, and/or any other suitable sensors configured to measure a characteristic associated with a direct contact between multiple physical structures or surfaces. For example, the contact sensors 226 can measure the characteristic that corresponds to a grip of the end-effector on the target object 112 or measure the weight of the target object 112. Accordingly, the contact sensors 226 can output a contact measure that represents a quantified measure, such as a measured force or torque, corresponding to a degree of contact or attachment between the gripping element and the target object 112. For example, the contact measure can include one or more force or torque readings associated with forces applied to the target object 112 by the end-effector.

Suitable End Effectors and Related Components

Figure 3A:
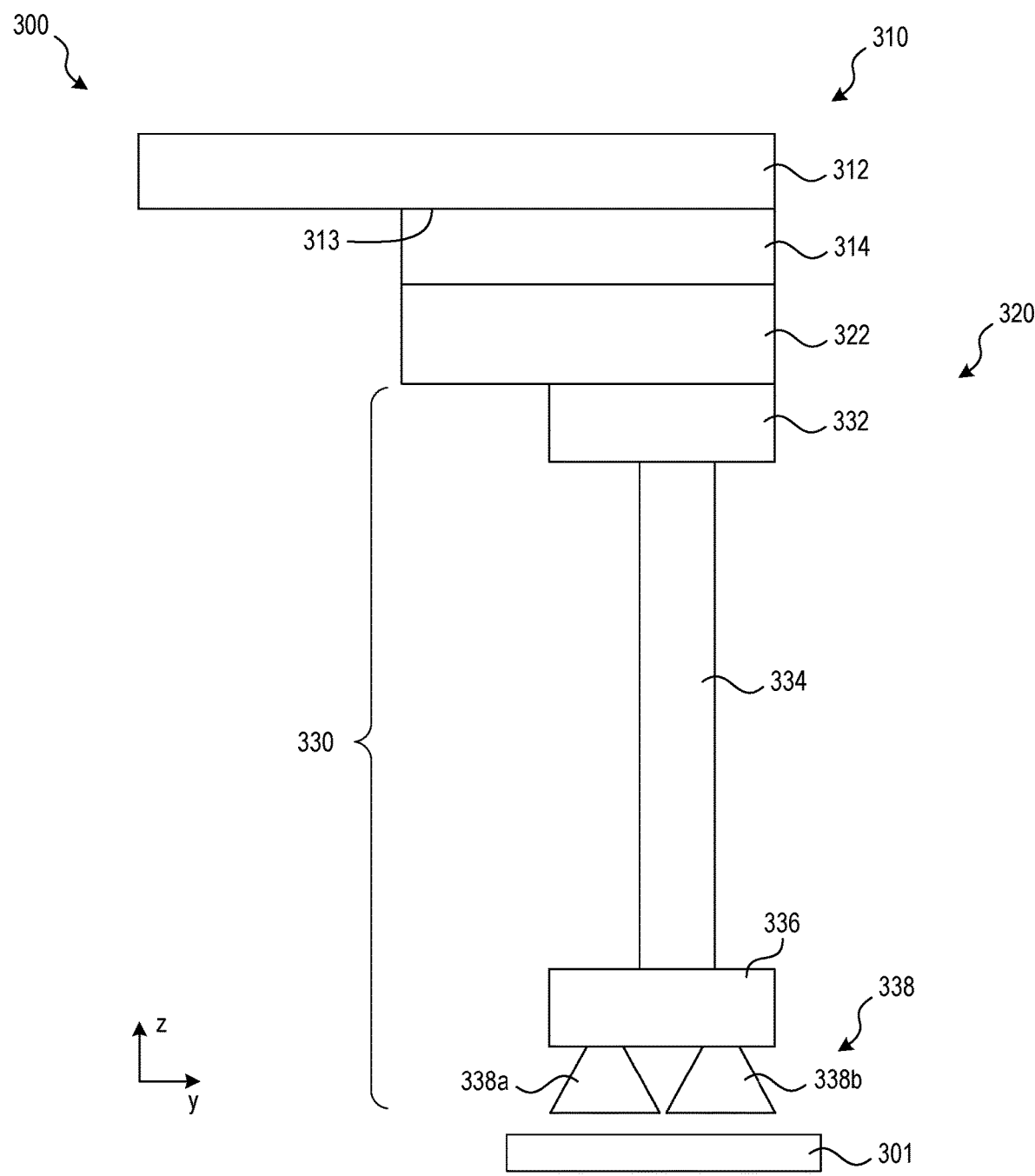
FIGS. 3A-3C are schematic diagrams illustrating various forces, as well as and various sources of noise in the forces, that are measured during operation of an end effector in accordance with some embodiments of the present technology.
Figure 3B:
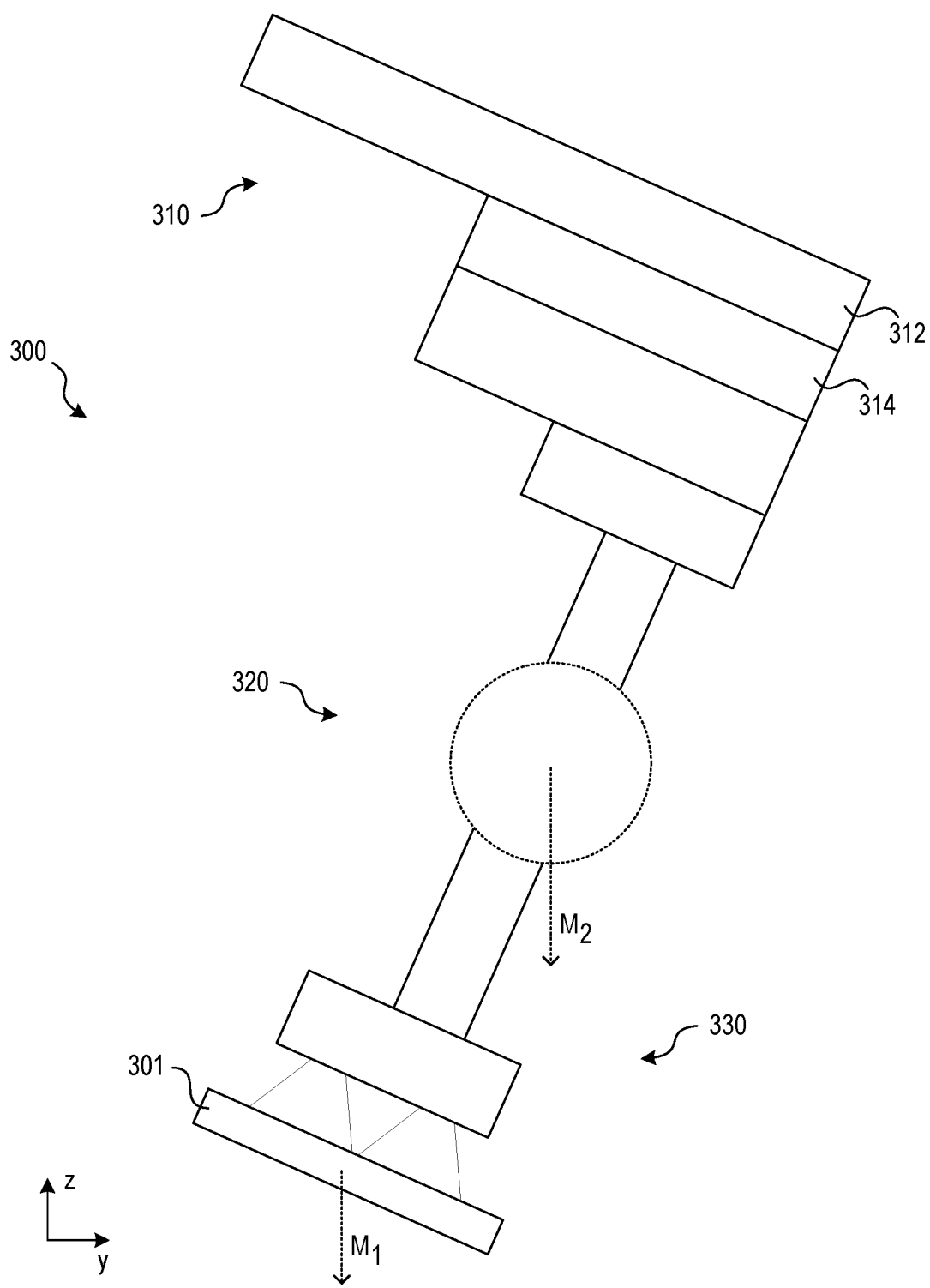
Figure 3C:
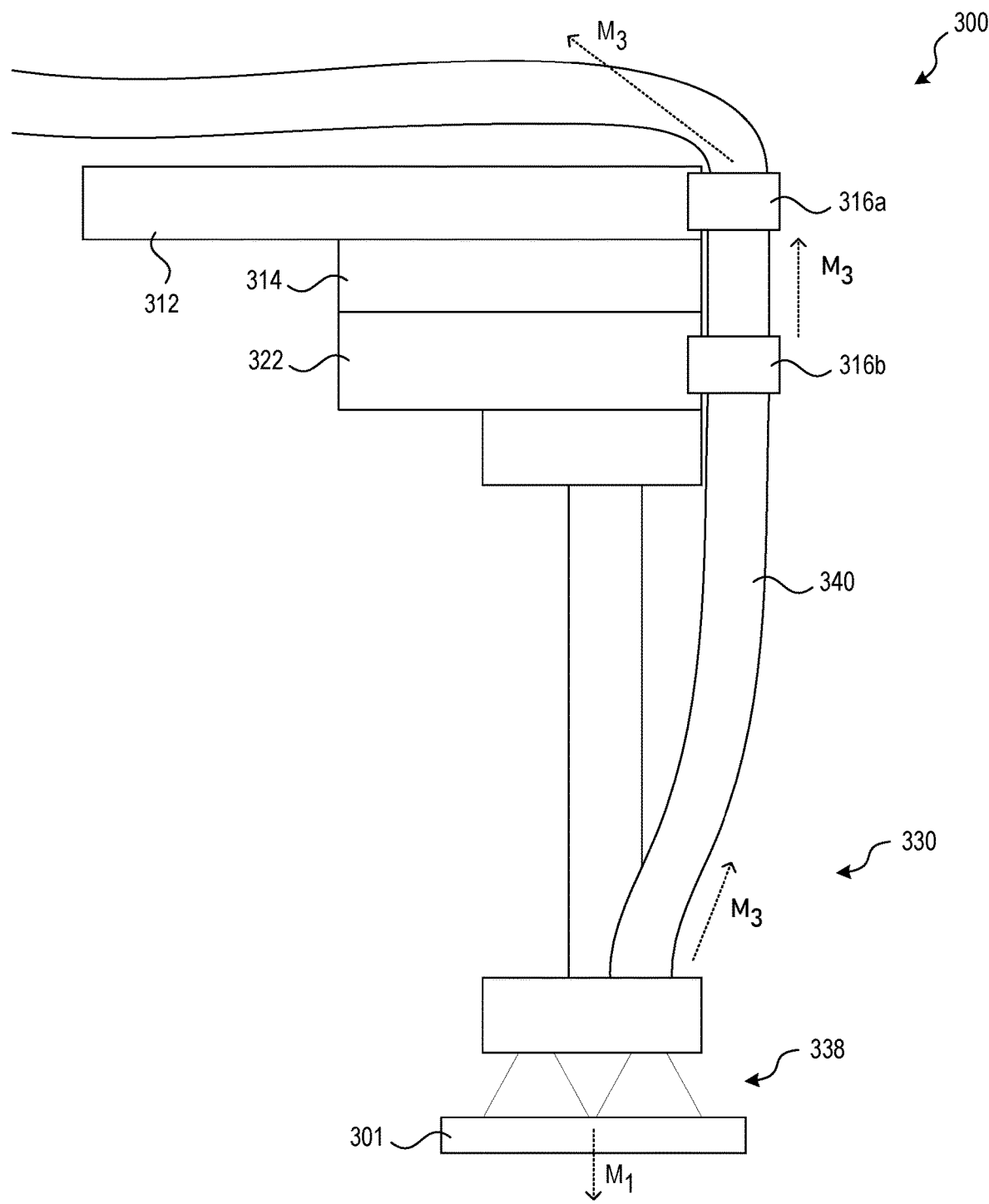

FIGS. 3A-3C are schematic diagrams of an end effector 300 illustrating various sources of measurable forces on the end effector 300, as well as various sources of noise in the measurable forces and a few features for accounting for the noise in accordance with some embodiments of the present technology. In particular, FIG. 3A is illustrates the basic design of the end effector 300; FIG. 3B illustrates the end effector 300 after picking a target object 301 and one example source of noise/errors associated with the picking operation; and FIG. 3C illustrates the end effector 300 while picking the target object 301 and another example source of noise/errors associated with the picking operation, as well as various features for accounting for the noise in accordance with some embodiments of the present technology.

As illustrated with respect to FIG. 3A, the end effector 300 can include an upper portion 310 and a lower portion 320 coupled to (e.g., carried by) the upper portion 310. The upper portion 310 includes an upper mounting component 312 and a force-torque sensor 314 ("FT sensor 314," sometimes also referred to herein as a "force sensor") coupled to a lower surface 313 of the upper mounting component 312. The lower portion 320 includes a lower mounting component 322 coupled to the FT sensor 314, as well as a gripper assembly 330 (also referred to herein as a "picking assembly") coupled to the lower mounting component 322. In the illustrated embodiment, the gripper assembly 330 includes an upper bracket 332, and extension component 334, and a gripper head 336. The upper bracket 332 mounts the to the lower mounting component 322 to attach the gripper assembly 330 to the end effector 300. The extension component 334 fixes a position of the gripper assembly 330a predetermined, known distance away from the lower mounting component 322 along at least one axis (e.g., along the z-axis). The gripper assembly 330 also includes one or more gripping components 338 (two shown, referred to individually as a first gripping component 338a and a second gripping component 338b) that are coupled to the gripper head 336 and configured to grip and/or release one or more target objects 301 (one shown).

In some embodiments, the lower portion 320 can include a gripper head (e.g., a gripping tool) that can be interchangeable (e.g., swapped out) according to the picking operation. For example, the lower portion 320 can include a first set of gripping components (e.g., a vacuum-based gripper having a first quantity/size of suction cups) configured to grab a first set of target objects while a second set of gripping components (e.g., a vacuum-based gripper having a second quantity/size of cups or a pincher-based gripper) configured to grab a second set of target objects. The first set of gripping components and the second set of gripping components can be interchangeable with the end effector 300, while the upper portion 310 remains the same. As a result, for example, a single upper mounting component 312 and force-torque sensor 314 can be used with a variety of interchangeable lower portions for a variety of picking operations.

The FT sensor 314 is configured to measure forces that pass through a plane of the FT sensor 314. For example, in the illustrated embodiment, the FT sensor 314 is disposed in an x-y plane to measure the z-axis component of forces that pass through the FT sensor 314. Further, the lower portion 320 coupled to the FT sensor 314 (e.g., a direct attachment of the lower mounting component 322 to the FT sensor 314 or an indirect attachment of the lower mounting component 322 to the FT sensor 314). Thus, the mass of each of the components of the lower portion 320 (multiplied by gravitational acceleration) results in a force that can be measured by the FT sensor 314. In another example, the mass of the target object 301, once picked by the gripping components 338, also results in a force that can be measured by the FT sensor 314. By subtracting the force measurements due to the mass of the components of the lower portion 320 from the measurement (e.g., calibrating the FT sensor 314 to account for the mass of the components), the robotic system 100 (via, e.g., a controller coupled to the end effector 300) can use the measurements from the FT sensor 314 to determine whether a target object was picked up, how many target objects were picked up, whether an unintended object was picked up, whether a picking operation was successful, and/or various other determinations. Purely by way of example, the target object 301 can have a known mass, allowing the end effector 300 to confirm the forces measured by the FT sensor 314 are within and expected range based on the known mass (e.g., a force proportional to the known mass multiplied with gravity) and an error range for the FT sensor 314.

Accurately measuring the forces and/or making any of the determinations above, however, becomes complicated during operation of the end effector 300. Purely by way of example, when the end effector 300 is used to pick lightweight target objects, such as objects with a mass of less than about 0.5 kilograms (kg), the lightweight target objects can have a mass than is less than, or significantly less than, the lower portion 320 of the end effector 300. As a result, the magnitude of a change in the force due to a disturbance to the end effector (referred to herein as "disturbance forces") can be similar to or greater than the magnitude of a change in the force due to picking and/or placing the lightweight target objects. Disturbance forces can result from shifts in the components of the end effector 300 due to operation (e.g., shifts when the gripping head is engaged/disengaged), cross-talk between forces, motion of the end effector 300 (e.g., as the end effector 300 rises, the upward acceleration changes the force measured by the FT sensor 314), changes in orientation, collisions or contact between the end effector 330 and other objects in the operation environment (e.g., due to imprecise operation), and various other sources. A few of these sources may be unavoidable (e.g., disturbance forces due to a change in orientation and/or motion that is necessary for a picking operation, disturbance forces due to engaging and/or disengaging the gripper assembly 330, and the like), thereby requiring the end effector 300 (and/or a controller coupled to the end effector 300) to account for the disturbance forces. FIGS. 3B and 3C illustrate two examples of sources of the disturbance forces.

For example, FIG. 3B illustrates the end effector 300 rotated with respect to the orientation illustrated in FIG. 3A. In this orientation, the FT sensor 314 is oriented to measure forces through a plane that has components in the x, y, and z axes. Meanwhile, the mass of the target object 301 results in a force along the z-axis (shown schematically by first force component $M_1$), which results in a torsional force on the FT sensor 314. That is, the mass of the target object 301 results in a torsional force that is dependent on the orientation of the end effector 300, such that only a portion of the first force component $M_1$ is measured by the FT sensor 314. Similarly, the mass of the components of the lower portion 320 of the end effector 300 results in a force along the z-axis (shown schematically by second force component $M_2$), which results in a torsional force on the FT sensor 314. Accordingly, the mass of the lower portion 320 results in a torsional force that is dependent on the orientation of the end effector 300, such that only a portion of the second force component $M_2$ is measured by the FT sensor 314. The smaller portions of the first and second force components $M_1$, $M_2$ measured by the FT sensor 314 strain the ability of a controller and/or robotics system coupled (e.g., the robotics system 100 of FIG. 1) to the end effector 300 to analyze signals from the FT sensor 314 to make an accurate measurement. In some embodiments of lightweight target objects, the portion of first force component $M_1$ measured by the FT sensor 314 can be below the sensitivity for the FT sensor 314, such that the controller and/or robotics system may not be capable of distinguishing between a loaded configuration and an unloaded configuration. Further, as the picking operation is executed, the angle of the end effector can change, resulting in a dynamic portion of the first and second force components $M_1$, $M_2$ being measured by the force sensor 314 (e.g., such that a static deduction for the second force component $M_2$ is insufficient to calibrate the FT sensor 314).

Further, each of the components of the lower portion 320 and/or the target object 301 can cause an additional torsional force through the plane of the FT sensor 314 when the end effector 300 is rotated away from the illustrated orientation. Because the mass of the components of the lower portion 320 of the end effector 300 can be an order of magnitude larger than the mass of the target object 301, the torsional forces can cause disturbance forces at a magnitude large enough to prevent the controller and/or robotics system from being able to accurately identify the difference between a loaded configuration and an unloaded configuration using measurements from the FT sensor 314. In some embodiments, the additional torsional forces are inevitable (e.g., are associated with movement necessary to complete the picking operation), such that the measurements from the FT sensor 314 will either not be usable until the motion is complete or will require a more complicated force model with additional variables and/or terms to interpret.

FIG. 3C illustrates the end effector 300 of FIG. 3A with additional components in accordance with some embodiments of the present technology. In particular, as illustrated, the end effector includes connection tubes 340 operably coupled to the gripper assembly 330. Each of the connection tubes 340 can include one or more flexible and/or non-rigid and/or can be divided into one or more segments between fixation points. The connection tubes 340 supply a biasing force that allows the gripper assembly 330 to operate to grip, pick up, carry, and/or place the target object 301. Purely by way of example, the connection tubes 340 can supply a vacuum force to the gripping components 338 to allow the gripping components 338 to use a suctional force to grip, pick up and/or carry the target object 301. Accordingly, the connection tubes 340 are required to adequately operate the end effector 300. However, the connection tubes 340 can introduce an additional source of disturbance forces. For example, if unsecured, the connection tubes 340 can move in random, or quasi-random, directions during operation of the end effector 300. Further, like the components of the lower portion 320, the connection tubes can have a mass that is equal to (or greater than) a lightweight target object. Accordingly, the randomized movement of the connection tubes 340 during operation can cause error in the measurements by the FT sensor 314.

To reduce the movement, the connection tubes can be secured to the end effector 300. In the illustrated embodiment, for example, the end effector includes a first bracket 316a coupling the connection tubes 340 to the upper mounting component 312 and a second bracket 316b coupling the connection tubes 340 to the lower mounting component 322. While the brackets may reduce the movement of the connection tubes 340 (and the associated disturbance forces), they introduce a new source for a disturbance force. In particular, when the connection tubes 340 are engaged and/or disengaged, the biasing force they supply to the gripper assembly 330 is at least partially applied to the first and second brackets 316a, 316b. For example, as illustrated, the connection tubes 340 may constrict and/or contort when the vacuum force is applied. The brackets may provide contact points that enables the constriction/contortion of the connection tubes 340 to apply the biasing force that may pull along the direction of third force components $M_3$, at least one of which is directed through the FT sensor 314. Further, the exact orientation and/or magnitude of the third force component $M_3$ can be difficult to predict and/or empirically model. Purely by way of example, when the biasing force is a vacuum force applied through the connection tubes 340, the overall magnitude and orientation of the third force component $M_3$ can be dependent on complex airflow patterns and any remaining movement of the connection tubes 340. As a result, some remaining disturbance force will be incident on and measured by the FT sensor 314.

One approach is to account for the disturbance forces via software algorithms. Purely by way of example, the robotic system 100 (via, e.g., the controller operably coupled to the end effector 300) can perform highly planed, methodical movements such that a software algorithm can partially or entirely account for the disturbance forces by solving one or more relatively complex force equations. For example, when the end effector 300 is moved into a different orientation, the software algorithm can solve a series of equations to determine the expected force measurements at the new orientation and/or the expected force measurements as the end effector 300 is moved between orientations. Similarly, the software algorithm can model the non-linear effect of the engagement and/or disengagement of the biasing force on the expected force measurements to account for the noise from the connection tubes. In another approach, the end effector 300 can wait for force measurements to stabilize for a predetermined period after each operation/movement to allow disturbance forces caused by the operation to (e.g., due to movement of any components) to stabilize to an expected level. In some cases, however, the software-centric solutions can require relatively slow operation of the object-gripping system and/or approximating non-linear effects to accurately measure forces on the end effector 300. Purely by way of example, the software-centric solutions can be required to account for the randomized motion of components of the end effector 300, and/or the non-linear effect of the engagement and/or disengagement of the biasing force on the expected force measurements.

Another approach, discussed in more detail below, provides a mechanical solution to at least some of the disturbance forces incident on the FT sensor 314. For example, by isolating movement of the connection tubes 340 to the plane of the FT sensor 314, the portion of the disturbance force associated with the movement that is measured by the FT sensor 314 can be reduced below a measurable level (or eliminated altogether). Similarly, the isolation can direct the biasing force supplied by the connection tubes 340 through the FT sensor 314 in the plane of the FT sensor 314, thereby reducing the portion of the disturbance force measured by the FT sensor 314 below a measurable level (or eliminating it altogether). This reduction, or elimination, of disturbance forces is sometimes referred to herein as noise cancellation.

Figure 4:
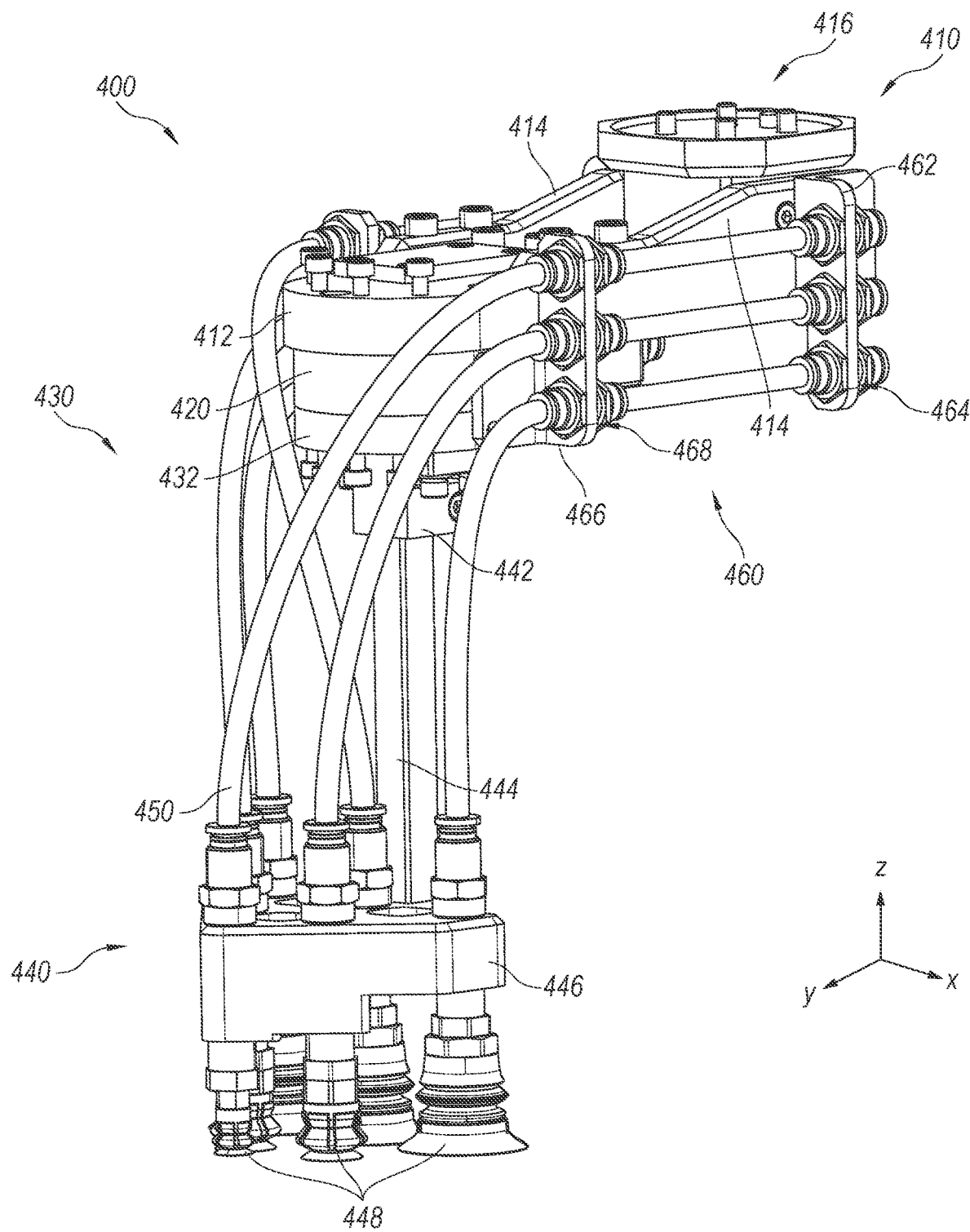
FIG. 4 is an isometric view of an end effector with noise cancellation features in accordance with some embodiments of the present technology.

FIG. 4 is an isometric view of an end effector 400 with noise cancellation features in accordance with further embodiments of the present technology. In the illustrated embodiment, the end effector 400 includes an upper portion 410, a force torque sensor 420 ("FT sensor 420," sometimes also referred to herein as a "force sensor") coupled to the upper portion 410, and a lower portion 430 coupled to the FT sensor 420. The upper portion 410 includes a first mounting structure 412 (also referred to herein as a "first mounting component" and/or an "upper mounting component"), as well as a reinforcement bracket 414 (also referred to herein as a "reinforcement plate" and/or a "reinforcement component") and an external connector 416 each coupled to the first mounting structure 412. The external connector 416 allows the end effector 400 to be operably coupled to another component in an object-gripping system, such as the robotic system 100 (FIG. 1). Purely by way of example, the external connector 416 can allow the end effector 400 to be operably coupled (e.g., mechanically, electrically, and/or fluidly coupled) to a robotic arm that positions/orients the end effector 400 and/or moves the end effector 400 between first and second locations (e.g., a picking location and a placing location).

The FT sensor 420 is coupled to the first mounting structure 412. The FT sensor 420 is configured to measure forces and/or torques that are oriented at an angle to a plane of the FT sensor 420. For example, in the illustrated embodiment, the FT sensor 420 is positioned in a longitudinal plane (e.g., the x-y plane), such that the FT sensor 420 measures components (or portions) of forces along a vertical direction (e.g., along the z-axis). Purely by way of example, any component that is carried by the FT sensor 420 has a mass that results in a gravitational force along the z-axis that can be measured by the FT sensor 420 (e.g., thereby measuring a weight of the component).

In the illustrated embodiment, the lower portion 430 includes a second mounting structure 432 (also referred to herein as a "second mounting component" and/or a "lower mounting component") coupled to (e.g., carried by) the FT sensor 420 and a gripper assembly 440 coupled to the second mounting structure 432. The gripper assembly 440 (also referred to herein as "a picking component," "a gripping head," and/or "a gripping component") includes an upper bracket 442, an extension arm 444 coupled to the upper bracket 442, a lower bracket 446 coupled to the extension arm 444, and one or more gripping components 448 (six shown) coupled to the lower bracket 446. The upper bracket 442 can secure the gripper assembly 440 to the second mounting structure 432. The lower bracket 446 is coupled to and stabilizes/supports the gripping components 448 during operation of the end effector 400. The extension arm 444 (also referred to herein as "an extension component") can fix a position of the lower bracket 446 along the z-axis with respect to the second mounting structure 432. The extension arm 444 can be useful, for example, to adjust the position of the gripping components 448 during a picking operation without moving the rest of the components of the end effector 400. The limited movement can help accommodate picking operations with limited clearance and/or can help reduce disturbance forces related to the overall movement of the end effector 400. In some embodiments, the extension arm 444 can be a replaced by a static arm/component and/or omitted altogether.

As further illustrated in FIG. 4, the gripping components 448 can be coupled to one or more connection tubes 450. As discussed above, each of the connection tubes 450 can introduce a disturbance force during operation of the end effector 400 due to their movement and/or communication of a biasing force into/through the FT sensor 420. To address the disturbance forces, the end effector 400 also includes a noise reduction system 460 and the connection tubes 450 are divided into sections between components of the noise reduction system 460 and the other features of the end effector 400. The noise reduction system 460 can reduce the overall movement of the connection tubes 450, absorb some of the resulting forces into the first and second mounting structures 412, 432, and/or isolate at least a portion of the disturbance forces associated with the connection tubes 450 to a longitudinal plane (e.g., parallel with the plane of the FT sensor 420). The sectional construction of the connection tubes 450 can help further the noise absorbing and/or force directing functions of the noise reduction system 460.

The noise reduction system 460 can include one or more first brackets 462 coupled to the first mounting structure 412, as well as one or more second brackets 466 coupled to the second mounting structure 432. Each of the first brackets 462 includes one or more tube-mounting components 464 that are configured to couple to and secure one or more of the connection tubes 450 (and/or spaces for tube-mounting components and/or spaces that mate with the connection tubes 450). As a result, each of the first brackets 462 anchors one or more of the connection tubes 450 to the first mounting structure 412 (e.g., upstream from the FT sensor 420). Similarly, each of the second brackets 466 includes one or more tube-mounting components 468 that are configured to couple to and secure one of the connection tubes 450 (and/or spaces for tube-mounting components and/or spaces that mate with the connection tubes 450). As a result, each of the second brackets 466 anchors one or more of the connection tubes 450 to the second mounting structure 432 (e.g., downstream from the FT sensor 420).

As illustrated in FIG. 4, each of the tube-mounting components 464 on the first brackets 462 can be parallel with a corresponding mounting component 468 on the second brackets 466 in a longitudinal direction. As a result, the sections of the connection tubes 450 between the first and second brackets 462, 466 are isolated to the same longitudinal plane as the FT sensor 420. Since the first bracket 462 is upstream from the FT sensor 420 while the second bracket 466 is down stream, the first and second brackets 462, 466 thereby isolate at least a portion of the disturbance forces from the secured section of the connection tubes 450 (e.g., due to their movement, their pulling during engagement and/or disengagement, and the like) to the longitudinal plane while traveling through the FT sensor 420. As a result, the z-direction component of the disturbance forces associated with the connection tubes 450 is zero (or nearly zero) when traveling through the FT sensor 420. Said another way, the first and second brackets 462, 466 isolate and/or secure the section of the connection tubes 450 that transmits forces through the FT sensor 420 a plane that is not measured by the FT sensor 420. The noise reduction system 460 can thereby significantly reduce (or eliminate) the forces associated with the connection tubes 450 that are measured by the FT sensor 420. This reduction (or elimination) is also referred to herein as reducing the noise from the connection tubes 450.

In some embodiments, the sectional construction of the connection tubes 450 allows the connection tubes 450 to be made from multiple materials (e.g., each of the connection tubes 450 can be a series of tubes corresponding to each of the sections). Purely by way of example, one or more sections of the connection tubes 450 can be a rigid material while one or more sections of the connection tubes 450 can be a relatively flexible material. In a specific, non-limiting example, the sections of the connection tubes 450 between the first and second brackets 462, 466 can be a relatively rigid material while the other sections of the connection tubes 450 are relatively flexible, non-rigid materials. The rigid construction of the sections between the first and second brackets 462, 466 can resist movement during engagement and/or disengagement of the biasing force, while the flexible construction of the other sections allow the end effector 400 to be moved into and used to grip target objects in any suitable orientation. As a result, the alternative construction of the various sections of the connection tubes can reduce the noise from the connection tubes 450 without limiting the functionality of the end effector 400.

Figure 5:
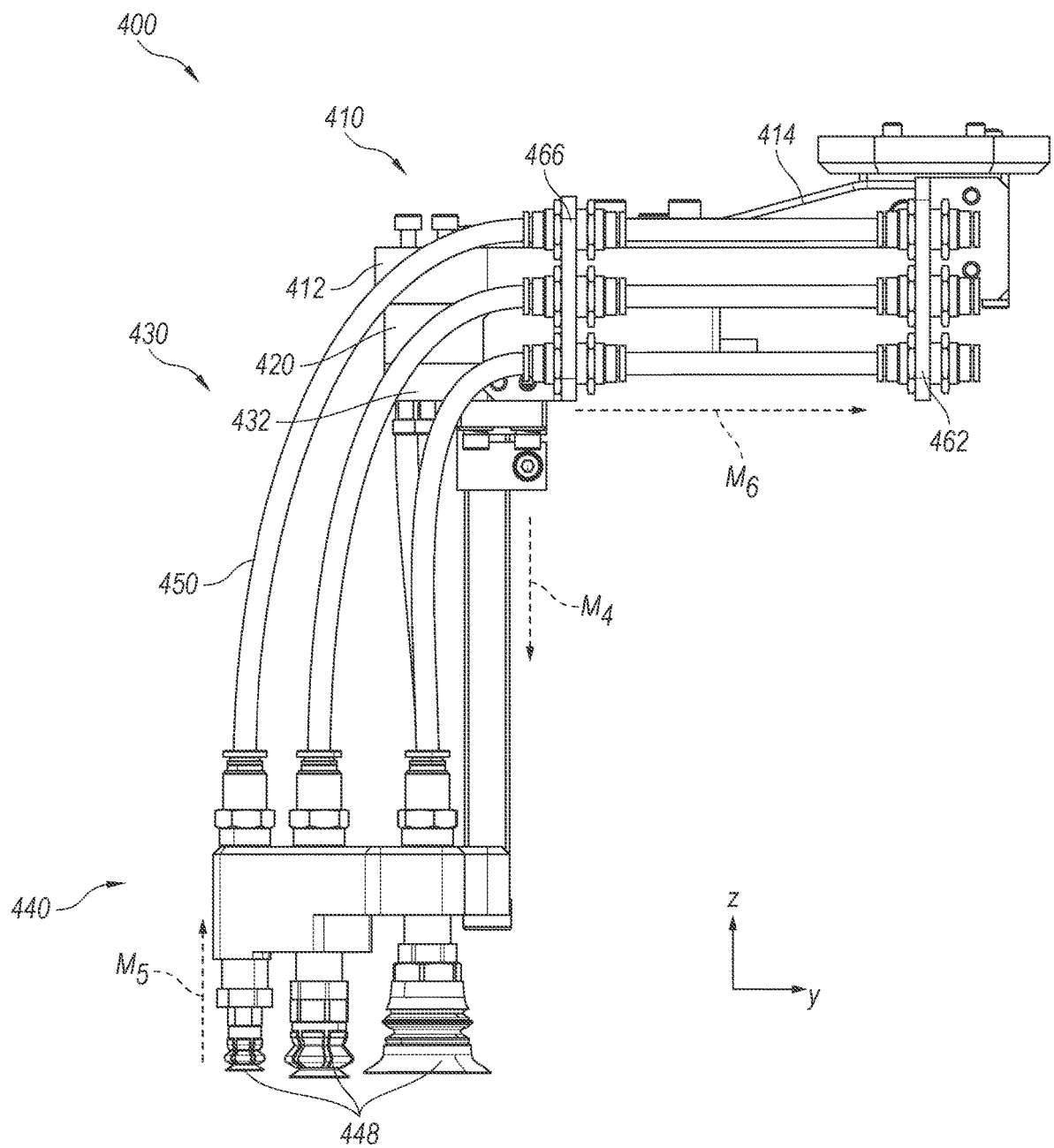
FIG. 5 is a side view of the end effector of FIG. 4 in accordance with some embodiments of the present technology.

FIG. 5 is a partially schematic side view of the end effector 400 of FIG. 4 illustrating the forces associated with the operation of the end effector 400 in accordance with some embodiments of the present technology. As discussed above, the end effector 400 includes the upper portion 410, the FT sensor 420 coupled to the upper portion 410, and the lower portion 430 coupled to the FT sensor 420. The FT sensor 420 is configured to measure forces orthogonal to a longitudinal plane of the FT sensor 420 (or the orthogonal components of forces that are angled with respect to the longitudinal plane). For example, the mass of the components if the lower portion 430 of the end effector 400 cause a force (e.g., corresponding to their weight) along a fourth force path $M_4$ in the z-direction. In this orientation, the forces associated with the mass of the components of the lower portion 430 are relatively constant, allowing the FT sensor 420 to be calibrated around them (e.g., tared, or zeroed, with the weight of the lower portion 430) and/or subtracted on the back end of the measurement.

Further, as discussed above, the gripping components 448 can be coupled to the connection tubes 450 to receive a biasing force (e.g., a suction force, voltage, current, pressure, and the like). The gripping components 448 use the biasing force to pick up one or more target objects by applying the biasing force along a fifth force path $M_5$. While supplying the biasing force, the connection tubes 450 also communicate forces into various components of the end effector 400 along a sixth force path $M_6$. For example, the connection tubes 450 typically shift adjacent to and/or pull on the first and second brackets 462, 466 while the biasing force is engaged and/or disengaged. Because the first and second brackets 462, 466 isolate the connection tubes 450 to the longitudinal direction, the sixth force path $M_6$ is largely (or entirely) disposed in the longitudinal plane. As a result, the component of the sixth force path $M_6$ that is in the z-direction (and therefore measured by the FT sensor 420) is close to zero (or zero). Further, because the first bracket 462 is upstream from the FT sensor 420 while the second bracket 466 is downstream from the FT sensor 420, the first and second brackets 462, 466 isolate a majority of (or all of) the forces from the movement of the connection tubes 450 during operation to the longitudinal direction while traveling through the FT sensor 420. In other words, the second bracket 466 can effectively translate or affix the effects of the biasing force to a location below (e.g., downstream from) the FT sensor 420, and the first and second brackets 462, 466 (via, e.g., the lateral orientation of the connection tubes 450 between the brackets) can effectively negate the noise inputs caused by portions of the connection tubes 450 upstream from the FT sensor 420.

As a result of each of the features discussed above, the noise reduction system 460 is able to mechanically reduce, or eliminate, the disturbance forces from the connection tubes 450. This reduction, or elimination, can allow the end effector 400 (and an associated robotics system) to complete a picking operation more quickly than a system relying on software and/or other analytic techniques for accounting for the disturbance forces. For example, the end effector 400 does not need to wait for non-linear forces resulting from the engagement and/or disengagement of the gripping components 448 to settle before being able to use the measurements from the FT sensor 420, even for operations involving lightweight target objects. In another example, the end effector 400 (and an associated robotics system) need not rely on (and wait for) a complex software computation to use the measurements from the FT sensor 420.

Additionally, or alternatively, the reduction (or elimination) of the disturbance forces from the connection tubes 450 can allow the end effector 400 (and an associated robotics system) to complete a picking operation more accurately than a system relying on software and/or other analytic techniques for accounting for the disturbance forces. For example, by reducing (or eliminating) the disturbance forces from the connection tubes 450, the end effector 400 can include a more sensitive FT sensor 420 without the disturbance forces causing errors in the measurement. As a result, the accuracy of any determinations made using the force measurements is improved. In another example, the end effector 400 can assign a higher confidence to the measurements from the FT sensor 420.

Figure 6A:
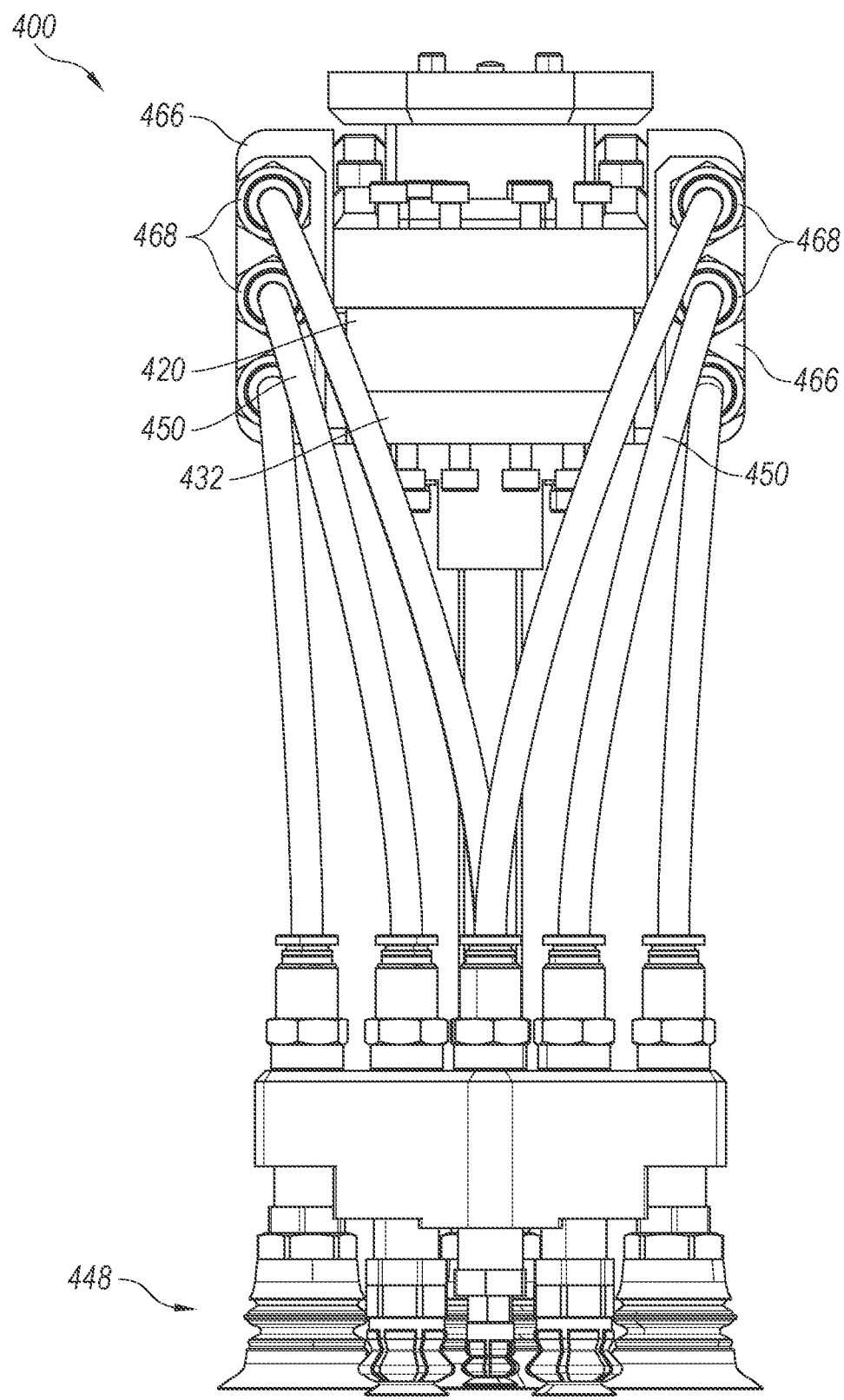
FIGS. 6A and 6B are front views illustrating additional features of the end effector of FIG. 4 in accordance with some embodiments of the present technology.
Figure 6B:
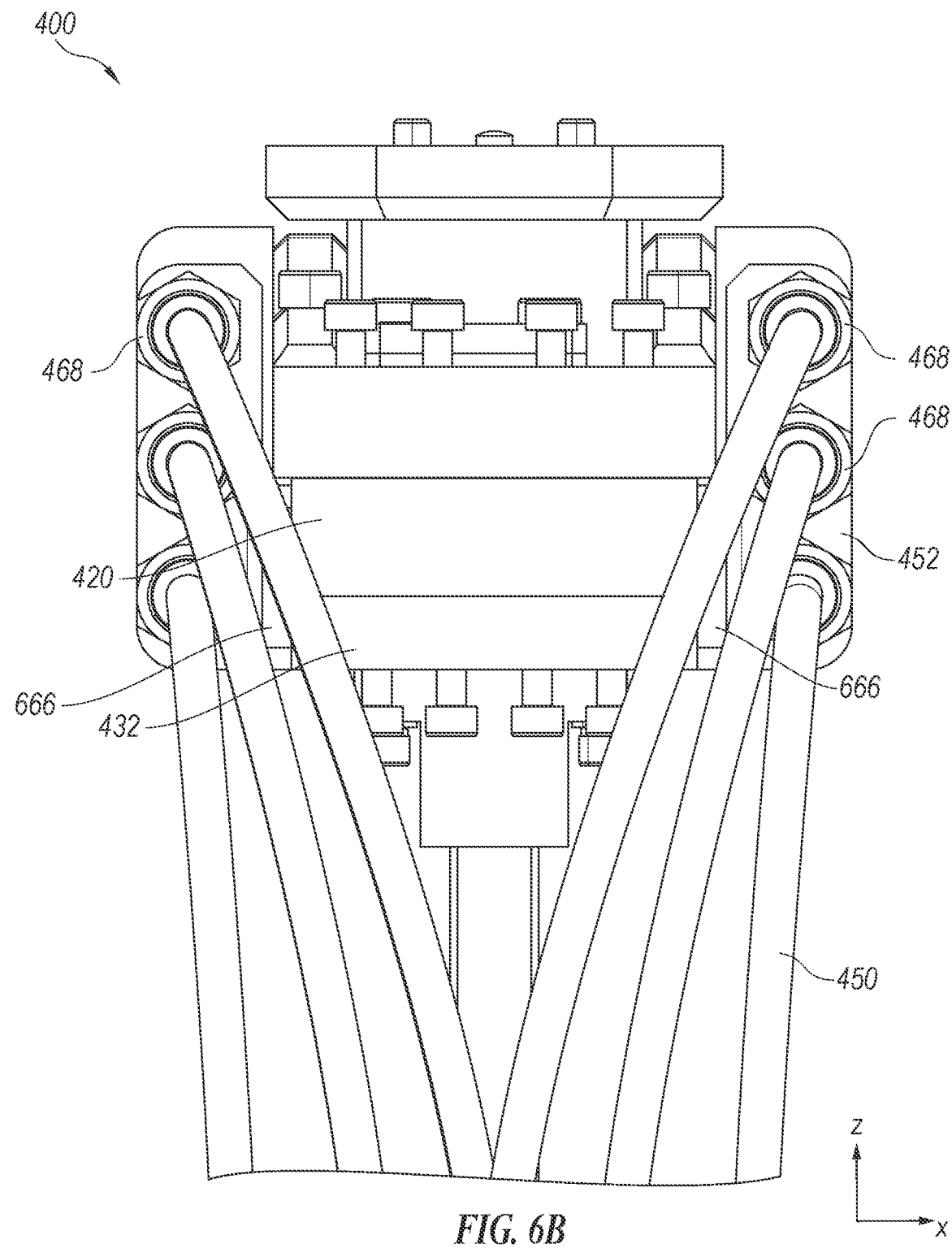

FIGS. 6A and 6B are front views illustrating additional features of the end effector 400 of FIG. 4 in accordance with some embodiments of the present technology. For example, in the illustrated embodiment, the noise reduction system 460 includes two second brackets 466, with one coupled to each side of the second mounting structure 432.

As best illustrated with respect to FIG. 6A, the second brackets 466 help organize the connection tubes 450. In particular, the second brackets 466 anchor the connection tubes 450 to the end effector to reduce the length of each of the connection tubes 450 that is free to move during operation of the end effector 400. Further, the tube-mounting components 468 on each of the second brackets 466 arrange the connection tubes 450 (and/or sections thereof) such that none of the connection tubes 450 overlap and/or can tangle. For example, the lowermost of the tube-mounting components 468 can be coupled to the connection tubes 450 that couple to the nearest of the gripping components 448. Similarly, the uppermost of the tube-mounting components 468 can be coupled to the connection tubes 450 that couple to the farthest of the gripping components 448. As a result, the connection tubes 450 can avoid interference forces, tangling during operation, and/or can be simpler to service when needed.

As best illustrated with respect to FIG. 6B, each of the second brackets 466 can include a mounting plate 666 coupled to the second mounting structure 432. In the illustrated embodiment, the second brackets 466 extend away from their mounting plates 666 in the vertical direction, such that the tube-mounting components 468 on each of the second brackets 466 are stacked in the vertical direction. This arrangement allows the second brackets 466 (as well as the first brackets 462 illustrated in FIG. 4) to occupy less space in an x-y plane, thereby decreasing the longitudinal footprint of the end effector 400. Further, as illustrated, the second brackets 466 do not extend vertically beyond the external connector 416. As a result, the illustrated orientation of the second brackets 466 (as well as the first brackets 462 illustrated in FIG. 4) does not increase the vertical footprint of the end effector 400.

Figure 7A:
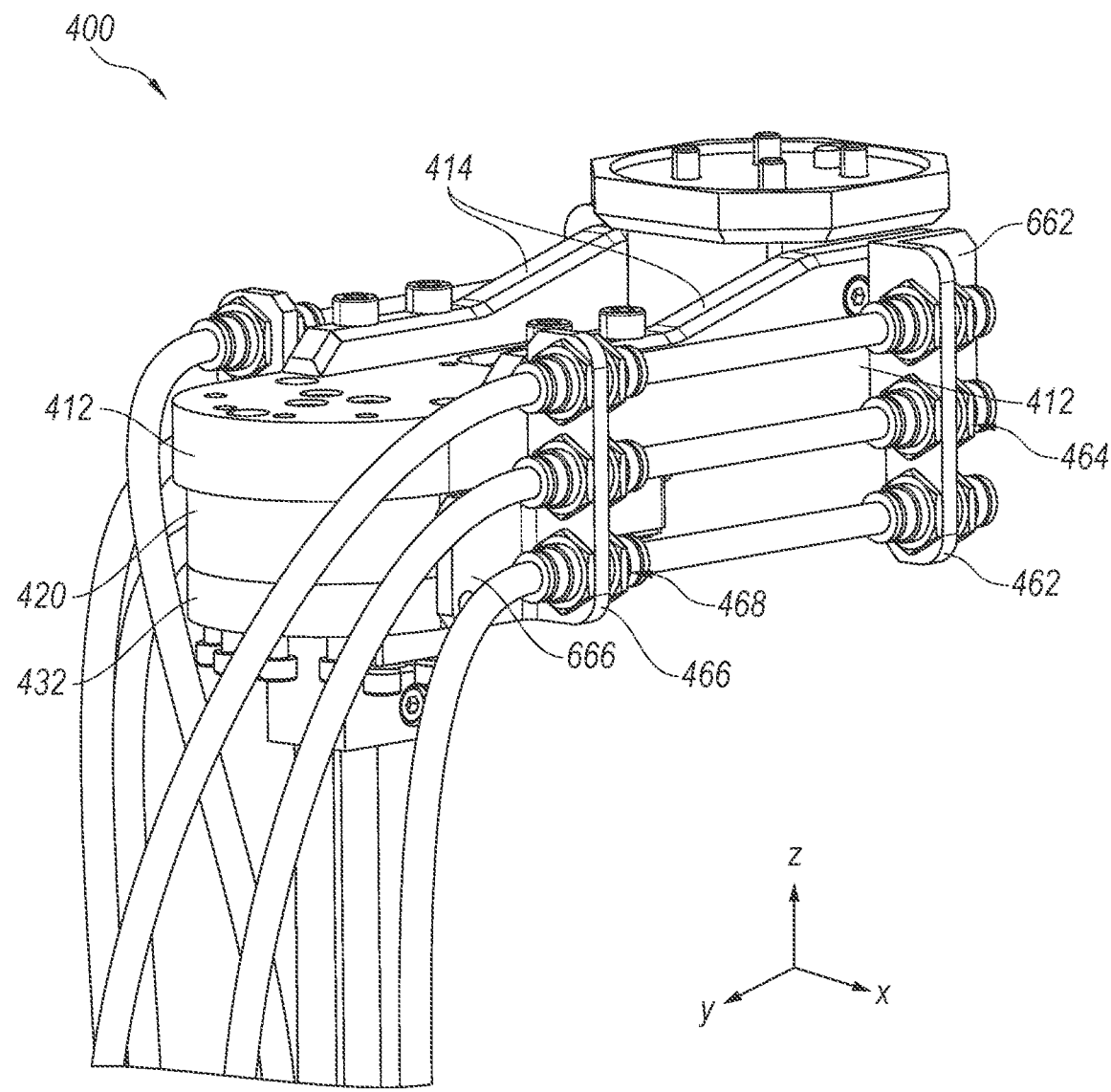
FIGS. 7A and 7B are isometric front and isometric rear views, respectively, illustrating additional features of the end effector of FIG. 4 in accordance with some embodiments of the present technology.
Figure 7B:
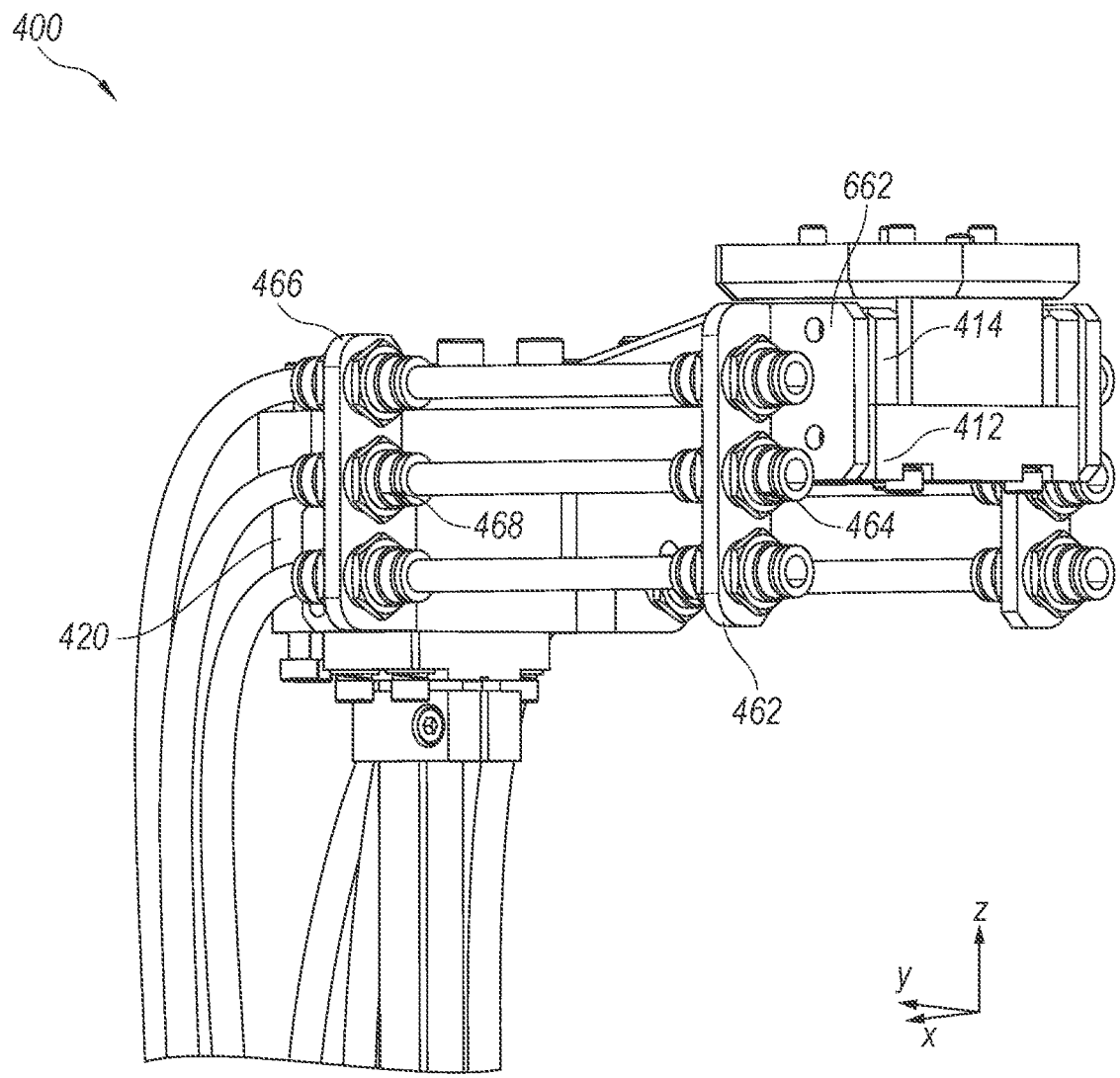

FIGS. 7A and 7B are isometric front and rear views, respectively, illustrating additional features of the end effector 400 of FIG. 4 in accordance with some embodiments of the present technology. In the illustrated embodiment, the noise reduction system 460 includes two first brackets 462, with one coupled to each side of the first mounting structure 412. Similar to the second brackets 466 discussed above with respect to FIGS. 6A and 6B, each of the first brackets 462 includes a mounting plate 662 that is coupled to the first mounting structure 412. The first brackets 462 then extend vertically away from the mounting plate 662 such that the tube-mounting components 464 on the first brackets 462 are parallel with the tube-mounting components 468 on the second brackets 466.

As further illustrated in FIGS. 7A and 7B, the mounting plate 662 of the first brackets 462 can also be coupled to the reinforcement bracket 414. As a result, the reinforcement bracket can help further stabilize the first brackets 462, thereby allowing the first brackets 462 to absorb a significant amount of disturbance forces upstream from the FT sensor 420 and before the disturbance forces can travel farther down the connection tubes 450. For example, because the first brackets 462 can be coupled to the upper portion 410 in two locations, the first brackets 462 are less susceptible to pivoting and/or shifting when the connection tubes 450 move during engagement and/or disengagement of the biasing force. Because the first brackets 462 are less susceptible to pivoting and/or shifting, less disturbance forces are communicated downstream from the first brackets 462.

Figure 8:
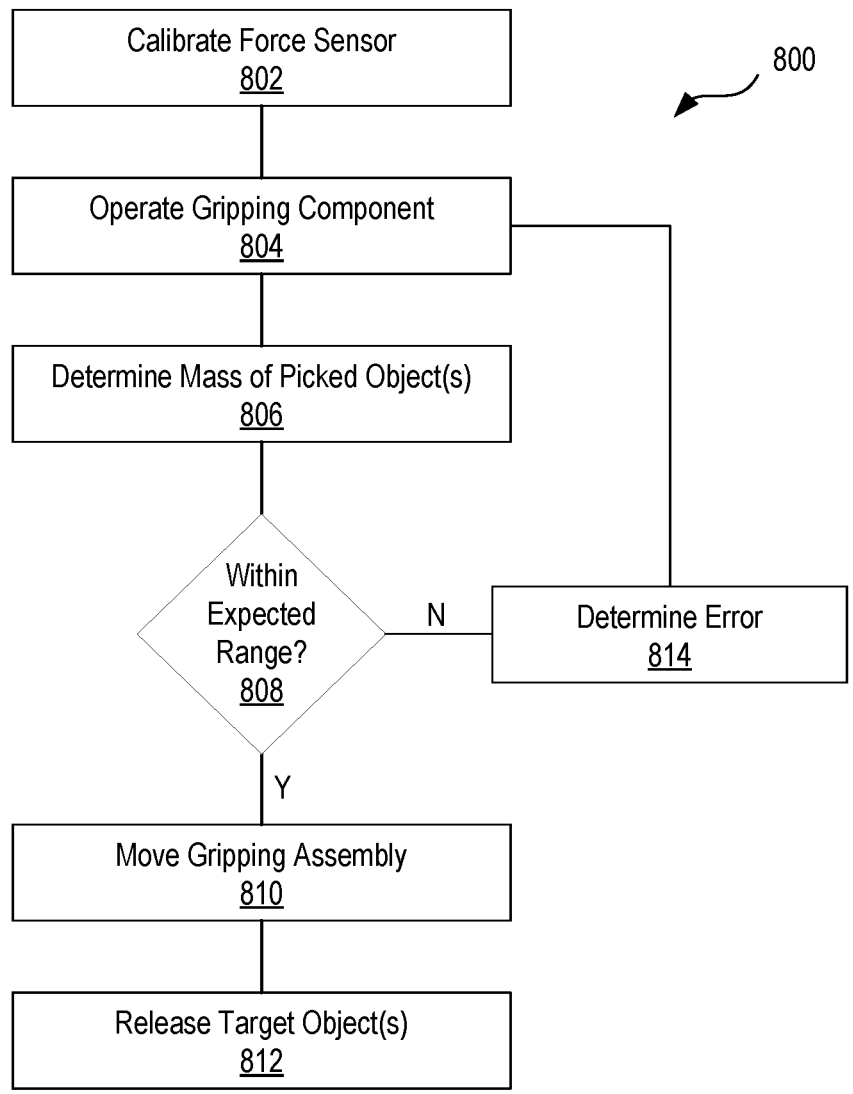
FIG. 8 is a flow diagram of a process for operating an end effector for use with a robotic object-gripping system in accordance with some embodiments of the present technology.

FIG. 8 is a flow diagram of a process 800 for operating an end effector of an object-gripping system (e.g., the end effector 400 discussed above with respect to FIG. 4) in accordance with some embodiments of the present technology. The process 800 can be executed by a controller on the end effector itself and/or by an external controller (e.g., the controller 109 of FIG. 1 having the processor 202 of FIG. 2).

The process 800 begins at block 802 by calibrating the force sensor on the end effector (e.g., the FT sensor 420 discussed above with respect to FIG. 4). The calibration accounts for the standing forces on the force sensor, such as the weight of each of the components of the lower portion of the end effector. The calibration can also include establishing a standard deviation for the force sensor, such that the process 800 can later discount minor fluctuations in the measured force and/or include the standard deviations in a determination about the measured force.

At block 804, the process 800 includes operating one or more gripping components on the end effector. Operating the gripping components can include positioning the end effector, and/or applying a biasing force to one or more of the gripping components. The biasing force actuates the gripping components, thereby causing the gripping components to grab a nearby object (e.g., the target object). In some embodiments, the operation at block 804 includes actuating only a subset of the gripping components on an end effector at a time. This allows the process 800 to, for example, operate a first subset of the gripping components at a first location (e.g., a first picking location), then operate a second subset of the gripping components at a second location (e.g., a second picking location).

At block 806, the process 800 includes determining a weight of the object(s) that are picked up when the one or more gripping components are operated. Determining the mass can include taking a measurement from the force sensor, applying any necessary filters (e.g., to subtract the weight of the components of the lower portion of the end effector, to divide by gravity to convert the measured force to a mass, and the like). In some embodiments, the determination at block 806 includes applying an algorithm (such as any of those discussed above with respect to FIGS. 3A-3C) that accounts for various sources of disturbance forces and/or other potential sources of error to filter the measurement from the force sensor. In some embodiments, the determination at block 806 includes determining an error range for the mass based on the force measurement, fluctuations in the force measurement, the standard deviation identified at block 802, identified disturbance forces, and/or other identified sources of error.

At decision block 808, the process 800 checks whether the mass of the picked object(s) is within an expected range for the target object(s). When the mass is within the expected range, the process 800 can determine that the picking operation at block 804 was successful and continue at block 810; else the process 800 can continue at block 814.

After a successful picking operation, at block 810, the process 800 includes moving the end effector from the picking location to a second location. In various embodiments, moving the end effector can be accomplished by various components of the object-gripping system and/or a related robotic system. Purely by way of example, the end effector can be moved from the first location to the second location by a robotic arm operably coupled to the end effector. In another example, the robotic arm itself can be moved between two locations (e.g., when attached to a moving vehicle). In some embodiments, as discussed above, the second location is a second picking location and the process can return to block 804 to operate one or more other gripping components. In the illustrated embodiment, the second location is a drop off location and the process 800 continues to block 812.

At block 812, the process 800 includes releasing the target object(s). In some embodiments, releasing the target object(s) includes disengaging the biasing force, causing the gripping components to actuate and release the target objects. For example, when the biasing force is a suction force, the suction force can be disengaged, such that the suction components of the gripping components de-attach from the target object(s). In some embodiments, releasing the target object(s) includes engaging an alternative biasing force, causing the gripping components to actuate and release the target object(s). For example, the alternative force can be a pressure force (e.g., as opposed to the suction force) that actively pushes the target object(s) away from the gripping components.

When the process 800 determines that the picking operation was not successful (e.g., when the measured mass is not within an expected range for the target object(s)), the process 800 continues to block 814. At block 814, the process 800 includes determining what error exists and/or what caused the error. In various embodiments, the determination can be made based on the measured mass, machine vision, one or more user inputs, and/or one or more measurements from other sensors (e.g., a sensor measuring whether each of the gripping components is engaged). For example, when the measured mass is below the expected mass, the process 800 can include determining which target object(s) were not picked up during the picking operation. In a specific, non-limiting example, when the gripping components operate using a suction force, the process 800 can include determining whether any of the gripping components have not engaged a target object (e.g., based on an "open circuit" in the suction force for any of the gripping components). In another example, when the measured mass is above the expected mass, the process 800 can include determining how much extra mass was measured, what unintended object was picked up, which gripping elements picked up the unintended object, and/or whether one or more target objects were not picked up (e.g., due to the unintended object being picked up in their place). In a specific, non-limiting example, the process 800 can include using machine vision and/or one or more user inputs to determine what unintended objects were picked up.

Once the process 800 determines what error exists and/or what caused the error, the process 800 returns to block 804 to restart the picking operation. In some embodiments, the return to block 804 includes dropping the unintended object. In some embodiments, the process 800 includes moving the end effector to a second location (e.g., a predetermined disposal location) before dropping the unintended object and returning to the first location to restart the picking operation.

It will be understood that, in some embodiments, one or more of the blocks 802-814 can be combined, executed in a different order, and/or omitted altogether. Purely by way of example, the process 800 can omit calibrating the force sensor at block 802 in embodiments in which the end effector is being used without changes between operations. That is, once the force sensor has been calibrated for a specific gripping head (e.g., for a specific tool mass), the force sensor does not always need to be recalibrated for a future use. In another example, the process 800 can omit calibrating the force sensor at block 802 in embodiments in which the process includes an algorithm accounting for the tool mass at block 806. Such embodiments are useful, for example, where the end effector is used in a dynamic setting, such that a single calibration is insufficient to account for the variable forces resulting from the tool mass. In another example, the process 800 can execute blocks 806 continuously to consistently measure the mass of any objects coupled to the end effector and/or to keep a record of the forces that are incident on the force sensor. As a result, for example, blocks 804 and 806 are executed simultaneously in such embodiments. In yet another example, blocks 806-812 can be executed simultaneously and/or in parallel to determine the mass of the picked objects, and whether the mass is within an expected range for the target object, while the end effector is already moving towards a drop off location. In such embodiments, the process 800 can complete and be repeated faster, thereby accelerating the overall pace of the robotic system and increasing throughput.

Figure 9A:
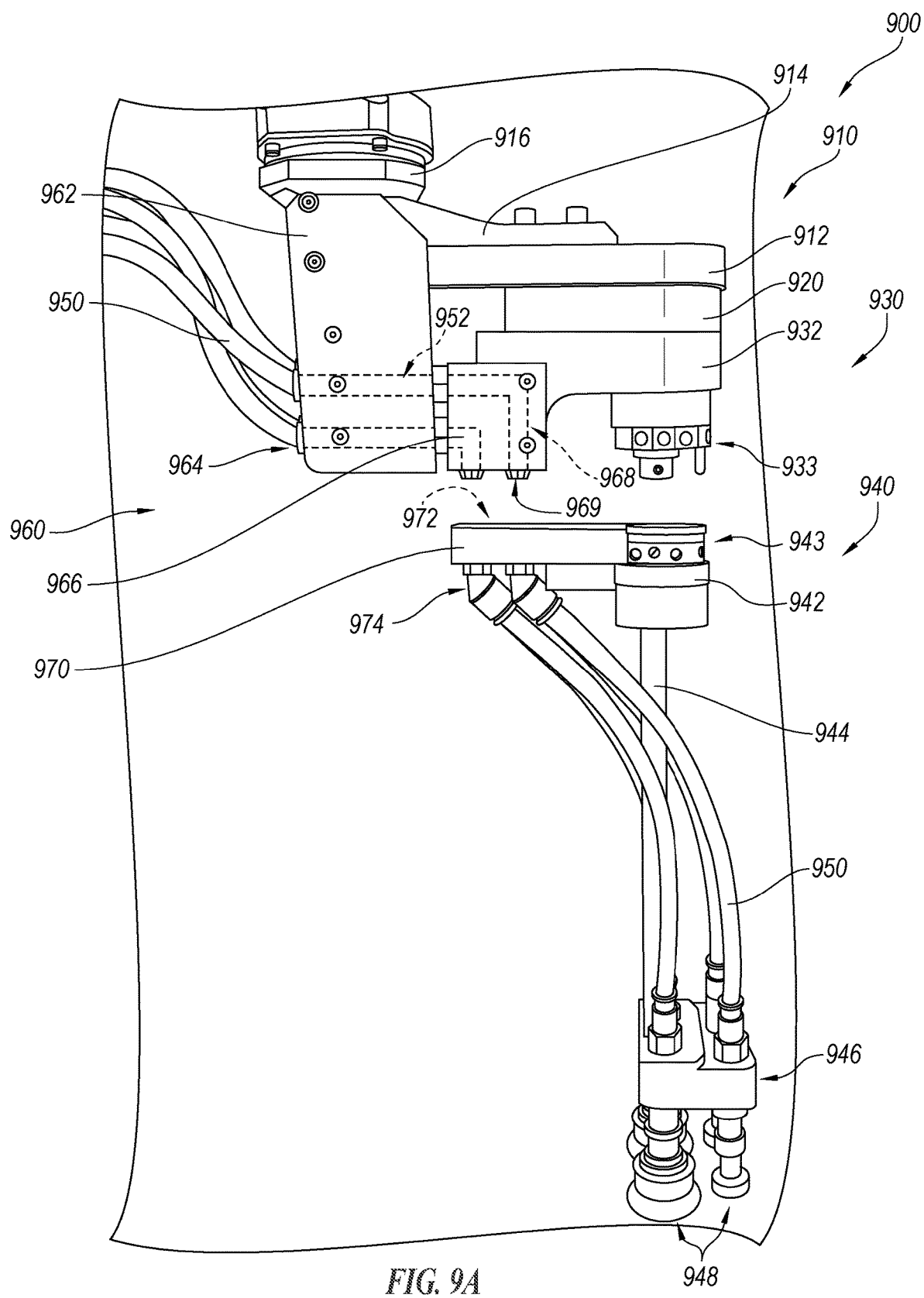
FIG. 9A is a side view illustrating additional features of an end effector of the type illustrated in FIG. 4 in accordance with some embodiments of the present technology.

FIG. 9A is a side view illustrating additional features of an end effector 900 in accordance with some embodiments of the present technology. In the illustrated embodiment, the end effector 900 is generally similar to the end effector 400 described above with reference to FIGS. 4-7. For example, the end effector 900 includes an upper portion 910, a force-torque sensor 920 ("FT sensor 920") coupled to the upper portion 910, and a lower portion 930 coupled to the FT sensor 920. The end effector 900 also includes one or more connection tubes 950 operably coupled to a gripper assembly 940 in the lower portion 930 and a noise reduction system 960 anchoring the connection tubes 950 to various components of the end effector 900. Further, the upper portion 910 includes a first mounting structure 912, as well as a reinforcement bracket 914 and an external connector 916 each coupled to the first mounting structure 912. The lower portion 930 includes a second mounting structure 932 and the gripper assembly 940. And the gripper assembly 940 includes an upper bracket 942, an extension arm 944 coupled to the upper bracket 942, a lower bracket 946 coupled to the extension arm 944, and one or more gripping components 948 coupled to the lower bracket 946.

In the illustrated embodiment, however, the lower portion 930 is configured to allow a tool change to swap out and/or modify the gripper assembly 940. For example, the lower portion 930 includes a first interface 933 on the second mounting structure 932 that mates with a second interface 943 on the upper bracket 942. The first and second interfaces 933, 943 can be connected to couple the upper bracket 942 to the second mounting structure 932 (thereby coupling the gripper assembly 940 to the second mounting structure 932). Once the first and second interfaces 933, 943 are connected to one another, the gripper assembly 940 is securely coupled to the second mounting structure 932 downstream from the FT sensor 920. As a result, the weight of the gripper assembly 940, and any objects gripped by the gripper assembly 940 can be measured by the FT sensor 920.

In some embodiments, the first and second interfaces 933, 943 include one or more actuating components that mechanically lock the upper bracket 942 to the second mounting structure 932. In some embodiments, discussed in more detail with respect to FIG. 9B, the first and second interfaces 933, 943 include one or more actuators that can be unlocked by a hydraulic and/or pneumatic fluid to complete the tool change.

As further illustrated in FIG. 9A, the noise reduction system 960 can also be configured to allow the tool change. For example, the noise reduction system 960 can include a third bracket 970 coupled to the upper bracket 942 of the gripper assembly 940. The third bracket 970 includes one or more tube-mounting components 974 that couple to a section of the connection tubes 950 downstream from the third bracket 970 (e.g., a section extending between the third bracket 970 and the gripping components 948). Further, as illustrated, the second bracket 966 can include a third interface 969 that mates with a fourth interface 972 on the third bracket 970. The third and fourth interfaces 969, 972 allow the biasing force (e.g., a vacuum force) to communicate through the connection tubes 950 with minimal (or no) leaks during operation. Conversely, during the tool change, the third and fourth interfaces 969, 972 allow the sections of the connection tubes 950 to be easily disconnected.

In various embodiments, the tool change can swap a first gripper assembly for a second gripper assembly to adjust the number, size, strength, type, and/or configuration of gripping components 948; adjust the length, orientation, and/or configuration of the extension arm 944; adjust the overall orientation of the gripper assembly 940; and/or otherwise adapt the end effector 900 for particular gripping operations. In a specific non-limiting example, a first gripper assembly can include six gripping components each having a first radius; a second gripper assembly can include three gripping components each having a second radius of and two gripping components each having a third radius; and a third gripper assembly can include two gripping components each having a fourth radius. Accordingly, the tool change can allow the end effector 900 to be partially customized between particular gripping operations and/or particular target objects.

In some embodiments, the tube-mounting components 968 of the second bracket 966 include an elbow joint that allows the tube-mounting components 974 on the third bracket 970 to be oriented in a vertical direction (e.g., downward toward the gripping components 948) while the sections 952 of the connection tubes 950 between the first and second brackets 962, 966 are oriented in a longitudinal plane (e.g., in a plane parallel to the FT sensor 920 and orthogonal to the direction measured by the FT sensor 920). Further, the first bracket 962 can be coupled to the first mounting structure 912 and/or the reinforcement bracket 914 and extend to a position parallel with the second bracket 966 (e.g., extending downward). The extension of the first bracket 962 allows the tube-mounting components 964 thereon to be parallel with the tube-mounting components 968 of the second bracket 966 in the longitudinal plane, thereby preserving the noise reduction features discussed in detail above.

Further, as illustrated in FIG. 9A, the illustrated configuration of the noise reduction system 960 can help reduce the longitudinal footprint of the end effector 900. For example, each of the first and second brackets 962, 966 (and the tube-mounting components 964, 968 thereon) protrude less from the footprint defined by the upper portion 910 and/or are contained at least partially within the footprint defined by the upper portion 910. As a result, the end effector 900 can have enough dexterity to operate in confined spaces and/or can avoid various noise-introducing collisions resulting from a larger footprint.

Figure 9B:
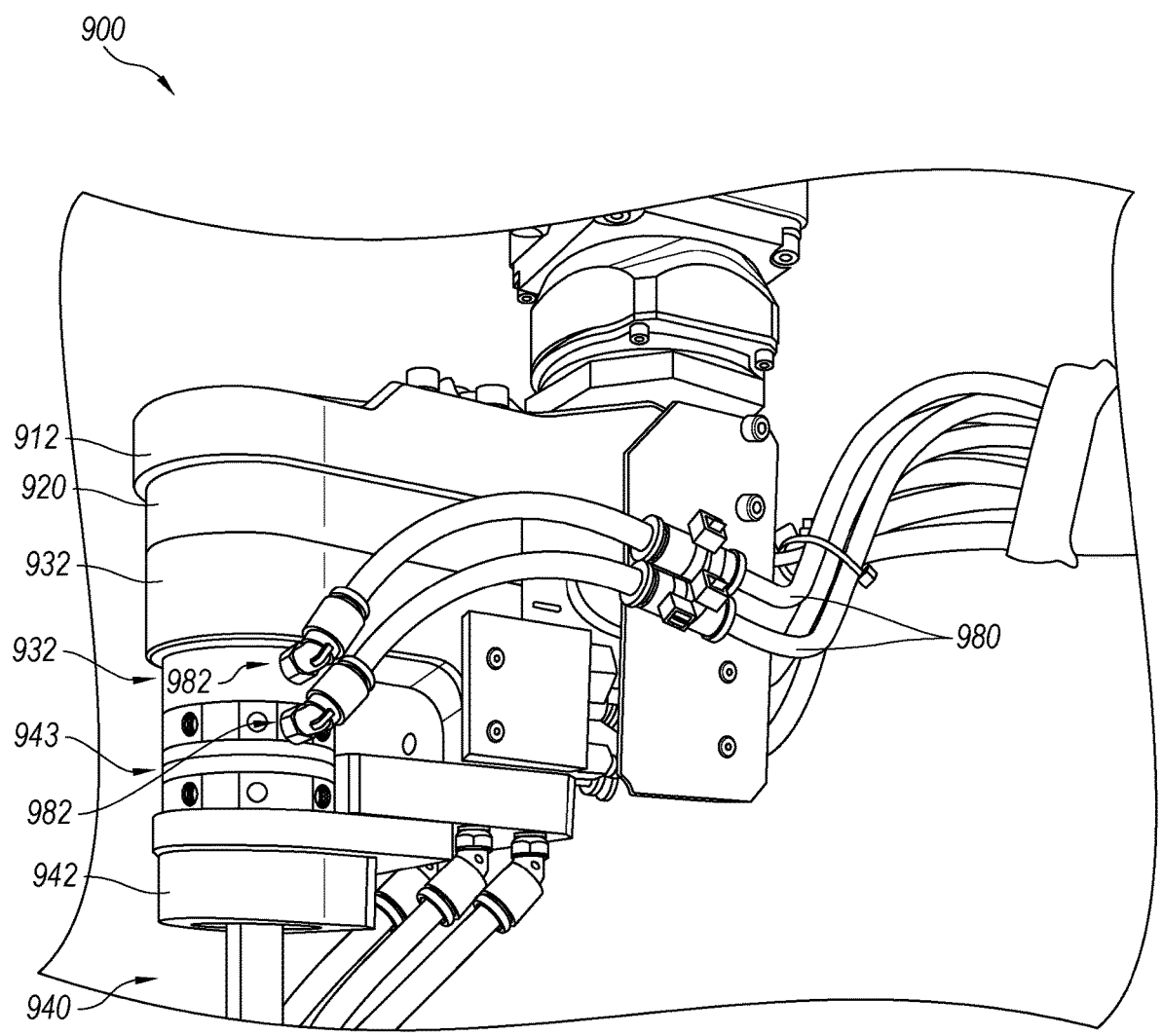
FIG. 9B is an isometric view of the end effector of the FIG. 9A in accordance with some embodiments of the present technology.

FIG. 9B is an isometric view of the end effector 900 of FIG. 9A in accordance with further embodiments of the present technology. In the illustrated embodiment, the end effector 900 is operably coupled to fluid lines 980 to aid in coupling and/or decoupling the gripper assembly 940 to the second mounting structure 932 on the lower portion 930. In particular, the fluid lines 980 can supply a hydraulic fluid (e.g., hydraulic oil) and/or a pneumatic fluid (e.g., compressed air) to one or more actuating components within the first and second interfaces 933, 943 (FIG. 9A) through one or more interfaces 982 (two shown). To swap the gripper assembly 940 for another tool, the fluid lines 980 can supply the hydraulic/pneumatic fluid to open the actuators and allow the first and second interfaces 933, 943 to disengage. Then, when the new tool is being coupled to the second mounting structure 932, the fluid lines 980 can supply the hydraulic/pneumatic fluid to open the actuators and allow the first interface 933 to mate with an interface on the new tool.

In some embodiments, the first and second interfaces 933, 943 (FIG. 9A) include one or more internal fluid communication channels that mate. The mated channels can allow the hydraulic/pneumatic fluid to flow between the first and second interfaces 933, 943. As a result, the fluid lines 980 can be operably coupled to only the second mounting structure 932 while supplying a force to actuators in both of first and second interfaces 933, 943. Because the fluid lines 980 are only operably coupled to the second mounting structure 932, no other connection/disconnection process is required during the tool change (e.g., connecting and disconnecting the fluid lines from the gripper assembly 940 and the new tool). Further, although illustrated as operably coupled to two fluid lines 980, it will be understood that the end effector 900 can be operably coupled another number of fluid lines 980. For example, in various other embodiments, the end effector 900 can be operably coupled to one, three, five, ten, or any other suitable number of fluid lines 980.

EXAMPLES

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. An end effector for use with a robotic system, the end effector comprising:
a first mounting structure having a first end couplable to a robotic arm of the object gripping assembly and a second end spaced apart from the first end in a longitudinal plane;
a force sensor coupled to the second end of the first mounting structure beneath the longitudinal plane and positioned to measure forces in a first direction at least partially orthogonal to the longitudinal plane;
a second mounting structure coupled to the second end of the first mounting structure beneath the force sensor;
a gripper assembly coupled to the second mounting structure and having a plurality of gripping components operably coupleable to a plurality of connection tubes and configured to grab one or more target objects;
a first bracket coupled to the first mounting structure and having one or more first tube-mounting components; and
a second bracket coupled to the second mounting structure and having one or more second tube-mounting components, wherein each of the one or more first tube-mounting components are aligned with a corresponding second tube-mounting component in a longitudinal direction parallel to the longitudinal plane and configured to hold the plurality of connection tubes in the longitudinal direction between the first bracket and the second bracket.

2. The end effector of example 1 wherein the one or more first tube-mounting components of the first bracket and the one or more second tube-mounting components of the second bracket are oriented to isolate a portion of each of the plurality of connection tubes in the longitudinal direction, wherein the isolation of the portion of each of the plurality of connection tubes in the longitudinal direction directs the biasing force along the longitudinal direction to bypass the force sensor.

3. The end effector of any of examples 1 and 2 wherein the first bracket and the second bracket are oriented perpendicular to the longitudinal plane to enable the plurality of connection tubes to be spaced apart from each other in the vertical direction while extending in the longitudinal direction.

4. The end effector of any of examples 1-3, further comprising a reinforcement component coupled to the first mounting structure and positioned to at least partially support the first bracket.

5. The end effector of any of examples 1-4 further comprising:
a third bracket coupled to the first mounting structure and having one or more third tube-mounting components; and
a fourth bracket coupled to the second mounting structure and having one or more fourth tube-mounting components, wherein each of the one or more third tube-mounting components are aligned with a corresponding fourth tube-mounting component in the longitudinal direction parallel to the longitudinal plane.

6. The end effector of any of examples 1-5 wherein the plurality of gripping components each include a suction component, wherein the biasing force is a suction force, wherein first and second brackets are attached to the first and second mounting structures, respectively, to reduce noise generated by an engagement of the suction force to the gripping components.

7. The end effector of any of examples 1-6 wherein the plurality of connection tubes are divided into sections by the first bracket and the second bracket, and wherein the sections include at least:

a first section between the gripper assembly and the second bracket; and a second section between the second bracket and the first bracket.

8. The end effector of any of examples 1-7 wherein the force sensor is calibrated with at least a mass of the second mounting structure, the gripper assembly, and the second bracket to account for the mass of the second mounting structure, the gripper assembly, and the second bracket.

9. The end effector of any of examples 1-8 wherein the force sensor is calibrated to measure masses with a precision between 0.01 kilograms (kg) and 0.5 kg.

10. A robotic system comprising:

a robotic arm;

an end-effector operable coupled to the robotic arm, the end-effector including:
   an arm connection component coupled to the robotic arm;
   a first mounting component having a first end adjacent the arm connection component and a second end spaced apart from the first end, wherein the first mounting component extends in a first direction;
   a force sensor carried by the second end of the first mounting component and positioned to measure forces in a second direction orthogonal to the first direction;
   a second mounting component carried by the second end of the first mounting component beneath the force sensor;
   an object-gripping head carried by the second mounting component and having a gripping component oriented in the second direction and operable to pick and release a target object;
   a noise reduction component, the noise reduction component including:
      a first bracket carried by the first mounting component; and
      a second bracket carried by the second mounting structure and aligned with the first bracket along the first direction; and
a connection tube operably coupled to the gripping component to supply a biasing force operate to the gripping component, wherein the connection tube is secured in a first location by the first bracket and a second location by the second bracket.

11. The robotic system of example 10 wherein the first location and the second location are at least partially aligned along the first direction to isolate the connection tube to the first direction between the first bracket and the second bracket.

12. The robotic system of any of examples 10 and 11 wherein the first bracket and the second bracket align the biasing force at least partially along the along the first direction between the first location and the second location.

13. The robotic system of any of examples 10-12 wherein the gripping component is a first gripping component, wherein the connection tube is a first connection tube, wherein the target object is a first target object, and wherein:

the object-gripping head further includes a second gripping component operable to pick and release a second target object;

the tube mounting apparatus further includes:
   a third bracket carried by the first mounting component opposite the first bracket; and
   a fourth bracket carried by the second mounting structure opposite the second bracket and aligned with the third bracket along the first direction; and
the robotic system further comprises a second connection tube operably coupled to the second gripping component to supply the biasing force operate to the second gripping component, wherein the second connection tube is secured in a third location by the third bracket and a fourth location by the fourth bracket.

14. The robotic system of any of examples 10-13 wherein the gripping component includes a suction component operably coupled to the connection tube, and wherein the biasing force is a suction force.

15. The robotic system of any of examples 10-14 wherein the end-effector further includes an extension arm coupled to the second mounting structure and the object-gripping head to adjust a position of the object-gripping head with respect to the second mounting structure along the second direction.

16. The robotic system of any of examples 10-15 wherein the first bracket is configured to at least partially isolate movement of the connection tubes as a result of movement in the robotic arm, and wherein the end-effector further includes a reinforcement component coupled to the first mounting component and the first bracket to add a second anchor point to the first bracket.

17. A method of operating a robotic system with an end effector, the method comprising:

generating commands for a picking process for the end effector to grab one or more target objects, wherein the commands for the picking process include applying a biasing force to the end effector;

receiving measurements, from a force sensor on the end effector, corresponding to a mass picked up by the end effector during the picking process;

determining, based on the measurements, whether the picking process was successful based on whether the measured mass is within an expected range for the one or more target objects based at least partially on an expected weight for the one or more target objects and a predetermined error range associated with the force sensor; and when the picking process was successful:
   generating commands for moving the end effector from a drop-off location; and
   generating commands for a placement process for the end effector to release the one or more target objects.

18. The method of example 17, further comprising calibrating the force sensor to account for a fixed mass of one or more components of the end effector coupled to the force sensor.

19. The method of any of examples 17 and 18, further comprising, when the picking process was not successful:

determining a source of error that does not include feedback from the biasing force; and generating commands for a repicking process for the end effector to account for the source of error.

20. The method of example 19 wherein the source of error is one or more of the following:

one or more missing target objects based on a misalignment between the end effector and the one or more target objects;

one or more missing target objects based on a malfunction of the end effector;

one or more missing target objects based on an incomplete picking process; or
one or more additional objects picked up during the picking process.

CONCLUSION

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. An end effector for use with a robotic system, the end effector comprising:
   a first mounting structure having a first end couplable to a robotic arm of the robotic system and a second end spaced apart from the first end in a longitudinal plane;
   a force sensor coupled to the second end of the first mounting structure beneath the longitudinal plane and positioned to measure forces in a vertical direction at least partially orthogonal to the longitudinal plane;
   a second mounting structure coupled to the second end of the first mounting structure beneath the force sensor;
   a gripper assembly coupled to the second mounting structure and having a plurality of gripping components operably coupleable to a plurality of connection tubes to receive a biasing force and configured to use the biasing force to grab one or more target objects;
   a first bracket coupled to the first mounting structure and having one or more first tube-mounting components; and
   a second bracket coupled to the second mounting structure and having one or more second tube-mounting components, wherein each of the one or more first tube-mounting components are aligned with a corresponding second tube-mounting component in a longitudinal direction parallel to the longitudinal plane and configured to hold the plurality of connection tubes in the longitudinal direction between the first bracket and the second bracket.

2. The end effector of claim 1 wherein the one or more first tube-mounting components of the first bracket and the one or more second tube-mounting components of the second bracket are oriented to isolate a portion of each of the plurality of connection tubes in the longitudinal direction, wherein the isolation of the portion of each of the plurality of connection tubes in the longitudinal direction directs the biasing force along the longitudinal direction to bypass the force sensor.

3. The end effector of claim 1 wherein the first bracket and the second bracket are oriented perpendicular to the longitudinal plane to enable the plurality of connection tubes to be spaced apart from each other in the vertical direction while extending in the longitudinal direction.

4. The end effector of claim 1, further comprising a reinforcement component coupled to the first mounting structure and positioned to at least partially support the first bracket.

5. The end effector of claim 1 further comprising:
   a third bracket coupled to the first mounting structure and having one or more third tube-mounting components; and
   a fourth bracket coupled to the second mounting structure and having one or more fourth tube-mounting components, wherein each of the one or more third tube-mounting components are aligned with a corresponding fourth tube-mounting component in the longitudinal direction parallel to the longitudinal plane.

6. The end effector of claim 1 wherein the plurality of gripping components each include a suction component, wherein the biasing force is a suction force, wherein first and second brackets are attached to the first and second mounting structures, respectively, to reduce noise generated by an engagement of the suction force to the gripping components.

7. The end effector of claim 1, wherein the plurality of connection tubes are divided into sections by the first bracket and the second bracket, and wherein the sections include at least:
   a first section between the gripper assembly and the second bracket; and
   a second section between the second bracket and the first bracket.

8. The end effector of claim 1 wherein the force sensor is calibrated with at least a mass of the second mounting structure, the gripper assembly, and the second bracket to account for the mass of the second mounting structure, the gripper assembly, and the second bracket.

9. The end effector of claim 1 wherein the force sensor is calibrated to measure masses with a precision between 0.01 kilograms (kg) and 0.5 kg.

10. A robotic system comprising:
    a robotic arm;
    an end-effector operably coupled to the robotic arm, the end-effector including:
      an arm connection component coupled to the robotic arm;
      a first mounting component having a first end adjacent the arm connection component and a second end spaced apart from the first end, wherein the first mounting component extends in a first direction;

a force sensor carried by the second end of the first mounting component and positioned to measure forces in a second direction orthogonal to the first direction;

a second mounting component carried by the second end of the first mounting component beneath the force sensor;

an object-gripping head carried by the second mounting component and having a gripping component oriented in the second direction and operable to pick and release a target object; and a noise reduction component, the noise reduction component including:
- a first bracket carried by the first mounting component; and
- a second bracket carried by the second mounting component and aligned with the first bracket along the first direction; and a connection tube operably coupled to the gripping component to supply a biasing force to the gripping component, wherein the connection tube is secured in a first location by the first bracket and a second location by the second bracket.

11. The robotic system of claim 10 wherein the first location and the second location are at least partially aligned along the first direction to isolate the connection tube to the first direction between the first bracket and the second bracket.

12. The robotic system of claim 10 wherein the first bracket and the second bracket align the biasing force at least partially along the first direction between the first location and the second location.

13. The robotic system of claim 10 wherein the gripping component is a first gripping component, wherein the connection tube is a first connection tube, wherein the target object is a first target object, and wherein:

the object-gripping head further includes a second gripping component operable to pick and release a second target object;

the noise reduction component further includes:
- a third bracket carried by the first mounting component opposite the first bracket; and
- a fourth bracket carried by the second mounting component opposite the second bracket and aligned with the third bracket along the first direction; and the robotic system further comprises a second connection tube operably coupled to the second gripping component to supply the biasing force operate to the second gripping component, wherein the second connection tube is secured in a third location by the third bracket and a fourth location by the fourth bracket.

14. The robotic system of claim 10 wherein the gripping component includes a suction component operably coupled to the connection tube, and wherein the biasing force is a suction force.

15. The robotic system of claim 10 wherein the end-effector further includes an extension arm coupled to the second mounting component and the object-gripping head to adjust a position of the object-gripping head with respect to the second mounting component along the second direction.

16. The robotic system of claim 10 wherein the first bracket is configured to at least partially isolate movement of the connection tube as a result of movement in the robotic arm, and wherein the end-effector further includes a reinforcement component coupled to the first mounting component and the first bracket to add a second anchor point to the first bracket.

* * * * *